US011427723B2

(12) United States Patent
Suzuki et al.

(10) Patent No.: US 11,427,723 B2
(45) Date of Patent: Aug. 30, 2022

(54) AQUEOUS INKJET INK AND METHOD FOR PRODUCING PRINTED ITEM

(71) Applicants: TOYO INK SC HOLDINGS CO., LTD., Tokyo (JP); TOYOCOLOR CO., LTD., Tokyo (JP)

(72) Inventors: Yoshihito Suzuki, Tokyo (JP); Atsushi Yoda, Tokyo (JP); Masahiro Sugihara, Tokyo (JP); Kazuhiro Jonai, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 1056 days.

(21) Appl. No.: 16/077,046

(22) PCT Filed: Apr. 17, 2018

(86) PCT No.: PCT/JP2018/015867
§ 371 (c)(1),
(2) Date: Aug. 10, 2018

(87) PCT Pub. No.: WO2018/194057
PCT Pub. Date: Oct. 25, 2018

(65) Prior Publication Data
US 2021/0130629 A1    May 6, 2021

(30) Foreign Application Priority Data
Apr. 21, 2017  (JP) .............................. JP2017-084301

(51) Int. Cl.
| C09D 11/322 | (2014.01) |
| B41J 2/21 | (2006.01) |
| C08K 5/053 | (2006.01) |
| C08L 25/14 | (2006.01) |
| C08L 83/04 | (2006.01) |

(52) U.S. Cl.
CPC ........... *C09D 11/322* (2013.01); *B41J 2/2125* (2013.01); *C08K 5/053* (2013.01); *C08L 25/14* (2013.01); *C08L 83/04* (2013.01)

(58) Field of Classification Search
USPC ...................................................... 106/31.86
See application file for complete search history.

(56) References Cited

U.S. PATENT DOCUMENTS

| 7,135,208 | B2 | 11/2006 | Kubota |
| 9,574,098 | B2 | 2/2017 | Fujii et al. |
| 2002/0007765 | A1 | 1/2002 | Sano et al. |
| 2005/0172855 | A1 | 8/2005 | Iijima et al. |
| 2007/0282033 | A1 | 12/2007 | Ito et al. |
| 2011/0234727 | A1 | 9/2011 | Aoki et al. |
| 2012/0154492 | A1 | 6/2012 | Hakiri et al. |
| 2012/0306954 | A1* | 12/2012 | Nishikawa ........... B41J 2/04581 347/11 |
| 2017/0369725 | A1 | 12/2017 | Mitsuyoshi et al. |
| 2018/0030298 | A1 | 2/2018 | Yamazaki et al. |

FOREIGN PATENT DOCUMENTS

| EP | 2671926 | 12/2013 |
| EP | 2960308 | 12/2015 |
| EP | 3653678 | 5/2020 |
| JP | H0940894 | 2/1997 |
| JP | 2001-152058 | 6/2001 |
| JP | 2001-354888 | 12/2001 |
| JP | 2001-354889 | 12/2001 |
| JP | 2002-146255 | 5/2002 |
| JP | 2004-210996 | 7/2004 |
| JP | 2005-220298 | 8/2005 |
| JP | 2008-247941 | 10/2008 |
| JP | 2011-080041 | 4/2011 |
| JP | 2012-052041 | 3/2012 |
| JP | 2014-167084 | 9/2014 |
| JP | 2014-205768 | 10/2014 |
| JP | 2016-125057 | 7/2016 |
| WO | 2012105704 | 8/2012 |
| WO | 2016152580 | 9/2016 |

OTHER PUBLICATIONS

"Search Report of Europe Counterpart Application", dated Nov. 26, 2020, p. 1-p. 6.

* cited by examiner

*Primary Examiner* — Fred M Teskin
(74) *Attorney, Agent, or Firm* — JCIPRNET

(57) ABSTRACT

One embodiment relates to an aqueous inkjet ink containing a pigment (A), a polymer compound (B), a water-soluble organic solvent (C) and a surfactant (D), wherein the water-soluble organic solvent (C) includes ethylene glycol and/or 1,3-propanediol (c1), and a water-soluble organic solvent (c2) having a specific static surface tension, the acid value of the polymer compound (B), the amount of water-soluble organic solvent having a boiling point at 1 atmosphere of 240° C. or higher, and the weight average boiling point at 1 atmosphere for the water-soluble organic solvent (C) are all prescribed values, and the blend amounts of the various components satisfy specific relationships.

10 Claims, No Drawings

AQUEOUS INKJET INK AND METHOD FOR PRODUCING PRINTED ITEM

CROSS-REFERENCE TO RELATED APPLICATION

This application is a 371 application of International PCT application serial no. PCT/JP2018/015867, filed on Apr. 17, 2018, which claims the priority benefit of Japan application no. 2017-084301, filed on Apr. 21, 2017. The entirety of each of the above-mentioned patent applications is hereby incorporated by reference herein and made a part of this specification.

TECHNICAL FIELD

Embodiments of the present invention relate to an aqueous inkjet ink and a method for producing a printed item.

BACKGROUND ART

Unlike conventional plate-base printing such as offset printing, digital printing does not require a printing plate, and can therefore realize cost reductions and space-saving effects. Further, among the various digital printing methods, the inkjet printing method is a method in which ink droplets are discharged from extremely fine nozzles and adhered to a substrate to obtain text or images. Using this type of method offers the advantages that noise from the printing apparatus is small, operability is excellent, and color production is simple, and as a result, inkjet printing has become widely used in output devices in offices and households.

Furthermore, as a result of improvements in inkjet technology, the use of inkjet printing for digital printing output devices in industrial applications is also expected to increase. In actual fact, inkjet printing devices for printing to plastic substrates such as polyvinyl chloride and polyethylene terephthalate (PET) are now commercially available. Until recently, solvent inks or UV inks have been used in inkjet printing for industrial applications. However, consideration of the potential harm of such inks to people and the environment and countermeasures designed to address this harm have, in recent years, resulted in the introduction of restrictions on the use of the solvents and monomers that represent the main components of the above inks, and therefore the demand for aqueous inks containing water as the main component as an alternative is growing.

Aqueous inks for inkjet printing already exist for printing to printing substrates such as plain paper and special-purpose inkjet papers (see Patent Literatures 1, 2 and 3). However, in recent years, with growing expectations for the type of expansion in potential applications of inkjet printing described above, there are growing needs for direct printing to low-absorption substrates typified by paper-based substrates such as art papers, coated papers and finely coated papers, and plastic substrates such as polypropylene, polyethylene and nylon.

Compared with plain paper and special inkjet paper, low-absorption substrates have some problems, including poor penetration or no penetration of aqueous inks into the substrate, poor drying of aqueous inks on the substrate, and an increased likelihood of a deterioration in the image quality. Specifically, voids caused by unsatisfactory wet spreadability of the aqueous ink, and color boundary bleeding and aggregation irregularities caused by coalescence of ink droplets of different hues tend to occur more readily. In particular, when high-speed printing is performed to a low-absorption substrate, before the aqueous ink droplets are able to dry, other aqueous ink droplets continue to be applied, thereby accentuating the above problems. As a result, in order to address these problems and enable printed items of superior image quality to be obtained even during high-speed printing, conventionally, a technique such as that disclosed in Patent Literature 4 has been used, in which a low-boiling point water-soluble organic solvent is used to improve the volatility of the aqueous ink. Further, in order to improve the aforementioned unsatisfactory wet spreadability of aqueous inks, a water-soluble organic solvent having a low surface tension and/or a surfactant is frequently used (see Patent Literatures 5 and 6).

Moreover, in recent years, in conjunction with the expansion in potential applications and the technical improvements in inkjet printing, investigations are being conducted into increasing the printing resolution in order to produce higher quality printed items. As the resolution is increased, the volume of the ink droplets discharged from the nozzles needs to be reduced, and there is a growing trend for an accompanying reduction in the diameter of the nozzles (the nozzle diameter).

When an inkjet head having a small nozzle diameter is used to print the type of aqueous ink having improved volatility described in Patent Literature 4, discharge faults become a major problem. Specifically, when the printer is awaiting a print job, or when the inkjet head is placed in standby mode for a long period or stored without the nozzles being capped, then there is a possibility that the aqueous ink may dry and adhere at the nozzle interface (the air-liquid interface at the nozzle discharge port), making normal discharge of the aqueous ink problematic when printing is restarted. In particular, if the aqueous ink solidifies and completely blocks the nozzle, then even the use of a head cleaning liquid or the like is unable to restore the original state. These risks increase as the nozzle diameter of the inkjet head is reduced.

In order to prevent discharge faults, a technique such as that described in Patent Literature 7 is typically used, in which a prescribed amount of a high-boiling point solvent such as glycerol is added to the aqueous ink. However, when a high-boiling point solvent is added to the ink, the time required for the aqueous ink to dry lengthens, meaning the problems described above worsen when printing to low-absorption substrates, resulting in printed items of inferior image quality.

Further, another possible method for suppressing discharge faults involves reducing the solid material within the ink that can cause solidification and adhesion. However, the solid material within an ink is composed of the pigment, binder resin and pigment dispersing resin and the like, and there is a possibility that reducing the amounts of these components may lead to a reduction in the image density of the printed items, a deterioration in the rub fastness, and a worsening of the storage stability and the like. These problems tend to become particularly marked in cases such as those described in Patent Literatures 5 and 6, where a water-soluble organic solvent having a low surface tension and/or a surfactant is also used in the ink. This is because these materials have a comparatively high hydrophobicity, and are therefore more likely to destroy the dispersed and/or dissolved state of the above solid materials.

As described above, no aqueous inkjet ink currently exists which is able to prevent discharge faults following a prescribed standby period, or when the inkjet head is placed in standby mode for a long period or stored without the nozzles being capped, is also able to produce high-quality printed items having superior drying properties and rub fastness, particularly when printing to low-absorption substrates, and also exhibits excellent storage stability.

CITATION LIST

Patent Literature

Patent Literature 1: JP 2001-354888 A
Patent Literature 2: JP 2004-210996 A
Patent Literature 3: JP 2008-247941 A
Patent Literature 4: JP 2014-167084 A
Patent Literature 5: JP 2012-052041 A
Patent Literature 6: JP 2014-205768 A
Patent Literature 7: JP 2001-354889 A

SUMMARY OF INVENTION

Technical Problem

Embodiments of the present invention have been developed to address the problems outlined above, and one embodiment has an object of providing an aqueous inkjet ink which can prevent discharge faults following a prescribed standby period, or when the inkjet head is placed in standby mode for a long period or stored without the nozzles being capped, can also produce high-quality printed items having superior drying properties and rub fastness, particularly when printing to low-absorption substrates, and also exhibits excellent storage stability. Another embodiment of the present invention has an object of providing a method for producing a printed item using the above aqueous inkjet ink, the method being capable of favorably resolving the problems described above and producing a printed item having excellent fine detail.

Solution to Problem

As a result of intensive research, the inventors of the present invention discovered that an aqueous inkjet ink containing a combination of a water-soluble organic solvent having a specific structure and a water-soluble organic solvent having a specific surface tension, and containing prescribed amounts of these water-soluble organic solvents, a pigment and a polymer compound, was able to achieve the object described above. Moreover, the inventors also discovered that a method for producing a printed item using a prescribed inkjet head supplied with the above aqueous inkjet ink was able to favorably achieve the above object, thus enabling the inventors to complete the present invention.

In other words, one embodiment of the present invention relates to an aqueous inkjet ink containing a pigment (A), a polymer compound (B), a water-soluble organic solvent (C) and a surfactant (D), wherein the acid value of the polymer compound (B) is from 10 to 100 mgKOH/g, the water-soluble organic solvent (C) includes ethylene glycol and/or 1,3-propanediol (c1), and a water-soluble organic solvent (c2) having a static surface tension at 25° C. of 20 to 37 mN/m, and the amount of water-soluble organic solvent having a boiling point at 1 atmosphere of 240° C. or higher is not more than 5% by weight relative to the total weight of the aqueous inkjet ink, the weight average boiling point at 1 atmosphere for the water-soluble organic solvent (C) is from 180 to 210° C., and relative to the total weight of the aqueous inkjet ink, if the amount of the pigment A is termed WA (% by weight), the amount of the polymer compound (B) is termed WB (% by weight), the amount of the ethylene glycol and/or 1,3-propanediol (c1) is termed WC1 (% by weight), and the amount of the water-soluble organic solvent (c2) having a static surface tension at 25° C. of 20 to 37 mN/m is termed WC2 (% by weight), then WA, WB, WC1 and WC2 satisfy all of formulas (1) to (5) shown below.

$$3 \leq WA \leq 7 \tag{1}$$

$$6 \leq WA+WB \leq 20 \tag{2}$$

$$10 \leq WC1+WC2 \leq 40 \tag{3}$$

$$0.25 \leq WC1/(WA+WB) \leq 1.75 \tag{4}$$

$$1.5 \leq WC2/WC1 \leq 5 \tag{5}$$

Further, one embodiment of the present invention relates to the aqueous inkjet ink described above, wherein the water-soluble organic solvent (c2) having a static surface tension at 25° C. of 20 to 37 mN/m contains a 1,2-alkanediol of 3 to 6 carbon atoms.

Furthermore, one embodiment of the present invention relates to the aqueous inkjet ink according to either of the above embodiments, wherein the ethylene glycol and/or 1,3-propanediol (c1) contains ethylene glycol.

Further, one embodiment of the present invention relates to the aqueous inkjet ink according to any one of the above embodiments, wherein the amount of the surfactant (D) is from 1 to 5% by weight of the total weight of the aqueous inkjet ink.

Furthermore, one embodiment of the present invention relates to the aqueous inkjet ink according to any one of the above embodiments, wherein the surfactant (D) contains a siloxane-based surfactant.

Furthermore, another embodiment of the present invention relates to a method for producing an aqueous inkjet ink printed item, the method having a step of discharging the aqueous inkjet ink according to any one of the above embodiments from an inkjet head and adhering the aqueous inkjet ink to a printing substrate, and a step of drying the printing substrate with the adhered aqueous inkjet ink, wherein the nozzle diameter of the inkjet head is from 15 to 25 μm, and the design resolution of the inkjet head is 600 dpi or higher.

The disclosure of this application is related to the subject matter disclosed in prior Japanese Application 2017-084301 filed on Apr. 21, 2017, the entire contents of which are incorporated herein by reference.

Advantageous Effects of Invention

One embodiment of the present invention is able to provide an aqueous inkjet ink which can prevent discharge faults following a prescribed standby period, or when the inkjet head is placed in standby mode for a long period or stored without the nozzles being capped, can also produce high-quality printed items having superior drying properties and rub fastness, particularly when printing to low-absorption substrates, and also exhibits excellent storage stability. Further, another embodiment of the present invention can provide a method for producing a printed item using the above aqueous inkjet ink, the method being capable of

DESCRIPTION OF EMBODIMENTS

One embodiment of the present invention relates to an aqueous inkjet ink (hereafter also referred to as simply "the aqueous ink", "the ink", or "the inkjet ink") that reduces discharge faults, can produce high-quality printed items having superior drying properties and rub fastness, and also exhibits excellent storage stability. Further, another embodiment of the present invention relates to a method for producing a printed item using the above aqueous inkjet ink that can favorably realize the effects described above, and yields a printed item having excellent fine detail.

Detailed descriptions of the aqueous inkjet ink and the method for producing a printed item that represent these embodiments of the present invention are presented below. However, the present invention is not limited by the following embodiments, and also includes modifications that can be implemented without departing from the scope of the present invention. Further, unless specifically stated otherwise, "parts" and "%" represent "parts by weight" and "% by weight" respectively.

As described above in relation to the background art, in order to obtain printed items of excellent image quality by high-speed printing to low-absorption substrates, the design of inks having superior drying properties and wet spreadability is required. Further, in order to produce printed items having excellent image density and rub fastness, at least certain amounts of a pigment and a polymer compound must be added to the aqueous ink. However, simply increasing the amount of water or low-boiling point organic solvent added in order to improve the drying properties, as has conventionally been the case, tends to lead to drying and adhesion of the aqueous ink at the nozzle interface, increasing the risk of discharge faults. Further, in those cases where a water-soluble organic solvent having a low surface tension and/or a surfactant is used to improve the wet spreadability of the ink, this tends to destroy the dispersed and/or dissolved state of the pigment and the polymer compound, which also tends to cause drying and adhesion of the aqueous ink at the nozzle interface, resulting in an increased likelihood of discharge faults. These risks naturally tend to increase as the amounts of the pigment and polymer compound in the ink are increased. Further, these types of aqueous inks that are prone to discharge faults also tend to suffer from unsatisfactory storage stability caused by destruction of the dispersed and/or dissolved state.

As a result of intensive investigation aimed at addressing these problems, the inventors of the present invention discovered that the problems could be resolved by using a combination of a water-soluble organic solvent having a specific structure and a water-soluble organic solvent having a specific surface tension, and prescribing the amounts and/or ratios of the above water-soluble organic solvents, a pigment and a polymer compound. An outline of embodiments of the present invention is described below.

<Aqueous Inkjet Ink>

In one embodiment of the present invention, in order to enable printed items of excellent image quality to be obtained by high-speed printing to low-absorption substrates, a combination of a water-soluble organic solvent (c2) having a static surface tension at 25° C. of 20 to 37 mN/m (hereafter sometimes referred to as simply "the low-surface tension solvent (c2)") and a surfactant (D) is used. By combining these two components, the liquid droplets of the aqueous ink undergo favorable wet spreading even on low-absorption substrates, and because the surfactant (D) orients at the surface of the liquid droplets, coalescence of the liquid droplets is suppressed. As a result, printed items of superior image quality, with no voids, color boundary bleeding or aggregation irregularities, can be obtained even during high-speed printing.

Further, if compounds that have conventionally been used as humectants, such as glycerol (boiling point: 290° C.), diethylene glycol (boiling point: 244° C.) and polyethylene glycol (boiling point: 250° C.), are used in excess, then the drying properties of the ink droplets on the substrate tend to deteriorate, and there is a possibility of a deterioration in the image quality. Accordingly, in the aqueous ink of one embodiment of the present invention, by prescribing the amount of water-soluble organic solvent having a boiling point at 1 atmosphere of 240° C. or higher, and the weight average boiling point at 1 atmosphere for the water-soluble organic solvent (C), any deterioration in the image quality can be prevented, particularly during high-speed printing to low-absorption substrates. Specifically, the amount of water-soluble organic solvent having a boiling point at 1 atmosphere of 240° C. or higher is limited to not more than 5% by weight of the total weight of the ink (meaning either such solvents are excluded, or if present, exist in an amount of 5% by weight or less), and the weight average boiling point at 1 atmosphere for the water-soluble organic solvent (C) is restricted to a value from 180 to 210° C.

On the other hand, an aqueous ink that uses the low-surface tension solvent (c2) and the surfactant (D), and has prescribed values for the amount of water-soluble organic solvent having a boiling point at 1 atmosphere of 240° C. or higher, and the weight average boiling point at 1 atmosphere for the water-soluble organic solvent (C), tends to be prone to the type of drying and adhesion at the nozzle interface mentioned above. In particular, if the nozzle diameter is reduced, then these phenomena tend to occur more readily. Further, these types of aqueous inks that are prone to drying and adhesion tend to also suffer from a deterioration in storage stability.

Accordingly, in one embodiment of the present invention, in addition to the low-surface tension solvent (c2), ethylene glycol and/or 1,3-propanediol (c1) (hereafter also referred to as "the specified diol (c1)") is also used as the water-soluble organic solvent (C). These water-soluble organic solvents have boiling points at 1 atmosphere of 197° C. and 214° C. respectively, and although they are more difficult to volatilize than water, they have similar molecular structures to water and therefore exhibit extremely high hydrophilicity, meaning they are unlikely to impair the dispersed and/or dissolved state of the pigment and the polymer compound. Accordingly, following volatilization of the water and the low-boiling point organic solvent, the aqueous ink retains the specified diol (c1), together with the low-surface tension solvent (c2) and the surfactant (D). It is thought that these solvent molecules exist in an arrangement that coats the pigment and the polymer compound, thereby suppressing any destruction of the dispersed and/or dissolved state of the pigment and the polymer compound, preventing drying and adhesion of the ink at the nozzle interface, and preventing any deterioration in the storage stability.

The inventors of the present invention surmised that in order to realize the above effects in a favorable manner, prescribing the amounts of the solid materials and the various solvents and the ratios between those components was very important, and they discovered that an aqueous ink in which the blend amounts of the pigment (A), the polymer compound (B), the specified diol (c1) and the low-surface tension solvent (c2) were adjusted so as to satisfy the formulas (1) to (5) shown below exhibited not only favorable image density, rub fastness, drying properties and image quality for the printed items, but also provided good suppression of discharge faults and superior storage stability.

$$3 \leq WA \leq 7 \quad (1)$$

$$6 \leq WA+WB \leq 20 \quad (2)$$

$$10 \leq WC1+WC2 \leq 40 \quad (3)$$

$$0.25 \leq WC1/(WA+WB) \leq 1.75 \quad (4)$$

$$1.5 \leq WC2/WC1 \leq 5 \quad (5)$$

In the above formulas (1) to (5), WA represents the amount of the pigment (A), WB represents the amount of the polymer compound (B), WC1 represents the amount of the specified diol (c1), and WC2 represents the amount of the low-surface tension solvent (c2), with each amount calculated as a weight % relative to the total weight of the aqueous ink.

By adjusting the amount of the pigment (A) so as to satisfy the formula (1), and adjusting the total amount of the pigment (A) and the polymer compound (B) (the amount of solid material) so as to satisfy the formula (2), a combination of favorable image density and favorable rub fastness for the printed items can be achieved with good balance. Further, by ensuring that the amount of solid material falls within the above range, the occurrence of discharge faults caused by the drying and adhesion of excess solid material, and deterioration in the ink storage stability caused by aggregation of excess pigment can also be prevented.

In addition, by adjusting the total weight of the specified diol (c1) and the low-surface tension solvent (c2) so as to satisfy the formula (3), a combination of favorable drying properties and image quality can be achieved for the printed items, particularly during high-speed printing to low-absorption substrates.

Moreover, by adjusting the ratios between the solid materials, the specified diol (c1) and the low-surface tension solvent (c2) to ensure that the formulas (4) and (5) are satisfied, the balance between these three components is adjusted to a favorable level, and the effect of the ethylene glycol and/or 1,3-propanediol (c1) in suppressing any destruction of the dispersed and/or dissolved state can manifest favorably. As a result, improvements in the storage stability and the suppression of discharge faults can be achieved, while maintaining favorable image density, rub fastness, drying properties and image quality for the printed items. Further, both of the specified diols (c1) have a high static surface tension, and an aqueous ink containing an excessive amount of these diols suffers from a deterioration in the wet spreadability of the ink on low-absorption substrates, and an increased likelihood of various problems occurring during printing, such as voids caused by unsatisfactory ink coverage, inferior drying properties, and color boundary bleeding and aggregation irregularities caused by the coalescence of ink droplets. Accordingly, in the present embodiment, in order to improve the wet spreadability of the aqueous ink on the printing substrate, thereby suppressing the occurrence of the above problems, the blend amounts of the ethylene glycol and/or 1,3-propanediol (c1) and the low-surface tension solvent (c2), and the ratio between those blend amounts, are adjusted so as to satisfy the above formulas (3) and (5).

In one embodiment of the present invention, in addition to the above requirements, the acid value of the polymer compound is also restricted to a value from 10 to 100 mgKOH/g. Although the detailed reasons are unclear, it is thought that by ensuring that the acid value of the polymer compound (B) falls within the above range, the affinity with the specified diol (c1) improves and the suppression effect on destruction of the dispersed and/or dissolved state can be strengthened, resulting in better suppression of discharge faults and improved storage stability.

As described above, discharge faults following a prescribed standby period, or when the inkjet head is placed in standby mode for a long period or stored without the nozzles being capped, can be prevented, and high-quality printed items having superior drying properties, no voids, color boundary bleeding or aggregation irregularities, and excellent rub fastness can be produced. In order to obtain an ink that also has excellent storage stability, a combination of the low-surface tension solvent (c2) and the surfactant (D) is used together with the ethylene glycol and/or 1,3-propanediol (c1), and the blend amounts of these as well as the pigment and the polymer compound, and the ratio between those blend amounts are optimized. It should be noted that the mechanisms described above are merely conjecture, and in no way limit the present invention.

Each of the components contained in the aqueous ink of embodiments of the present invention is described below.

<Pigment (A)>

In the aqueous ink of an embodiment of the present invention, either an inorganic pigment or an organic pigment may be used as the pigment (A). Examples of the inorganic pigment include titanium oxide, zinc oxide, zinc sulfide, white lead, calcium carbonate, precipitated barium sulfate, white carbon, alumina white, kaolin clay, talc, bentonite, black iron oxide, cadmium red, red iron oxide, molybdenum red, molybdate orange, chrome vermilion, chrome yellow, cadmium yellow, yellow iron oxide, titanium yellow, chromium oxide, viridian, titanium cobalt green, cobalt green, cobalt chrome green, Victoria green, ultramarine blue, Prussian blue, cobalt blue, cerulean blue, cobalt silica blue, cobalt zinc silica blue, manganese violet and cobalt violet.

Further, examples of the organic pigment include azo pigments, phthalocyanine pigments, anthraquinone pigments, quinacridone pigments, isoindolinone pigments, quinophthalone pigments, dye lake pigments and fluorescent pigments.

Specific examples of the pigments, listed in terms of their color index values, include cyan pigments such as C. I. Pigment Blue 1, 2, 3, 15:1, 15:3, 15:4, 15:6, 16, 21, 22, 60 and 64.

Further, examples of magenta pigments include C. I. Pigment Red 5, 7, 9, 12, 31, 48, 49, 52, 53, 57, 97, 112, 120, 122, 146, 147, 149, 150, 168, 170, 177, 178, 179, 184, 185, 188, 202, 206, 207, 209, 238, 242, 254, 255, 264, 269 and 282, and C. I. Pigment Violet 19, 23, 29, 30, 32, 36, 37, 38, 40 and 50.

Furthermore, examples of yellow pigments include C. I. Pigment Yellow 1, 2, 3, 12, 13, 14, 16, 17, 20, 24, 74, 83, 86, 93, 94, 95, 109, 110, 117, 120, 125, 128, 129, 137, 138, 139, 147, 148, 150, 151, 154, 155, 166, 168, 180, 185 and 213.

Moreover, examples of black pigments include carbon blacks produced by the furnace method or the channel method. Among these, carbon blacks having properties including a primary particle size of 11 to 40 nm, a specific surface area measured by the BET method of 50 to 400 m$^2$/g, a volatile fraction of 0.5 to 10% by weight, and a pH value of 2 to 10 are preferred. Examples of commercially available products having these types of properties include No. 33, 40, 45, 52, 900, 2200B, 2300, MA7, MA8 and MCF88 (all manufactured by Mitsubishi Chemical Corporation); RAVEN 1255 (manufactured by Columbian Chemicals Co., Inc.); REGA 330R, 400R and 660R, MOGUL L, and ELF-TEX 415 (all manufactured by Cabot Corporation), and Nipex 90, Nipex 150T, Nipex 160IQ, Nipex 170IQ, Nipex 75, Printex 85, Printex 95, Printex 90, Printex 35 and Printex U (all manufactured by Evonik Degussa GmbH). Any of these commercially available products can be used favorably.

Besides the above carbon blacks, examples of other black pigments that may be used in embodiments of the present invention include aniline black, Lumogen black, and azomethine azo black and the like. Further, a plurality of color pigments such as the cyan pigments, magenta pigments and yellow pigments described above, and special color pigments such as the brown pigments and orange pigments described below, may also be used to form a black pigment.

Examples of pigments other than the cyan, magenta, yellow and black pigments include C. I. Pigment Green 7, 10 and 36, C. I. Pigment Brown 3, 5, 25 and 26, and C. I. Pigment Orange 2, 5, 7, 13, 14, 15, 16, 24, 34, 36, 38, 40, 43, 62, 63, 64 and 71.

In embodiments of the present invention, as described above, the pigment is included in an amount of 3 to 7% by weight relative to the total weight of the ink. This amount is preferably at least 3.5% by weight but not more than 6.5% by weight, and more preferably at least 4% by weight but not more than 6% by weight. By ensuring that the amount is at least 3% by weight, printed items of excellent image density can be produced even when using absorbent substrates such as high-quality papers and special-purpose inkjet papers. Further, as mentioned above, by ensuring that the amount is not more than 7% by weight, a more favorable balance with the specified diol (c1) is obtained, the storage stability of the ink can be better ensured, and discharge faults can be favorably suppressed.

<Polymer Compound (B)>

Examples of known forms for the polymer compounds generally used in inkjet inks include emulsions, water-soluble resins, and hydrosols which are an intermediate form between the other two. In this description, the term "emulsion" describes a form in which an emulsifier is adsorbed to the surfaces of resin microparticles to disperse the microparticles in a dispersion medium. Further, the term "hydrosol" describes a form in which the acidic and/or basic functional groups that exist within a resin exist in a neutralized state within a dispersion medium, and although having particle-like properties, is a form in which at least a portion of the surfaces of the resin particles are swollen and dissolved. In the embodiments of the present invention, any of the above forms may be used as the polymer compound (B).

Among these forms, emulsions and hydrosols contain higher molecular weight resins than water-soluble resins, can lower the viscosity of the ink, and because they enable larger amounts of resin to be included in the ink, are suitable for enhancing the durability of the printed items.

On the other hand, when the polymer compound (B) is in the form of an emulsion, it is desirable that the minimum film forming temperature (MFT) of the emulsion is also taken into consideration. When an emulsion having a low MFT is used, the MFT of the resin microparticles tends to decrease further due to the effects of the water-soluble organic solvent added to the ink, and as a result, fusion and/or aggregation of the resin microparticles can occur even at room temperature, causing discharge faults. In order to achieve superior improvement in the discharge properties, it is preferable that the MFT of the emulsion is adjusted to a value of at least 60° C. by appropriate selection of the monomers that constitute the resin microparticles. The MFT value can be measured, for example, using an MFT Tester manufactured by Tester Sangyo Co., Ltd.

Further, in those cases where a hydrosol or water-soluble resin is used as the polymer compound (B), the weight average molecular weight of the resin is preferably within a range from at least 10,000 to not more than 50,000, and is more preferably within a range from at least 20,000 to not more than 40,000. When the weight average molecular weight is at least 10,000, the rub fastness of the printed items is favorable. When the weight average molecular weight is not more than 50,000, the discharge stability from the inkjet head can be maintained in a favorable state.

The weight average molecular weight of the polymer compound (B) can be measured using typical methods. For example, the weight average molecular weight can be measured as a polystyrene-equivalent weight average molecular weight, using a TSKgel column (manufactured by Tosoh Corporation) and a GPC (HLC-8120GPC, manufactured by Tosoh Corporation) fitted with an RI detector, and using THF as the eluent.

As mentioned above, the acid value of the polymer compound (B) in embodiments of the present invention is from 10 to 100 mgKOH/g, and is preferably from 15 to 80 mgKOH/g, and more preferably from 20 to 50 mgKOH/g. In addition to the improved affinity with the specified diol (c1) mentioned above, a polymer compound (B) having an acid value within the above range can be redissolved in the ink even if drying and adhesion were to occur at the nozzle interface, meaning even better suppression of discharge faults is possible. Moreover, when the acid value is not more than 100 mgKOH/g, printed items that also have excellent water resistance can be obtained.

The acid value can be calculated, for example, from the titer obtained when a solution of the polymer compound (B) is titrated with an ethanolic solution of potassium hydroxide (0.1 mol/L) using an automatic potentiometric titrator AT-710S manufactured by Kyoto Electronics Manufacturing Co., Ltd.

As described above, in embodiments of the present invention, if the weight percentage of the pigment (A) relative to the total weight of the ink is termed WA, and the weight percentage of the polymer compound (B) having an acid value of 10 to 100 mgKOH/g is termed WB, then the value of WA+WB is at least 6% by weight but not more than 20% by weight. This amount is preferably at least 7% by weight but not more than 18% by weight, and more preferably at least 8% by weight but not more than 15% by weight. By ensuring that this amount is at least 6% by weight, printed items having excellent image density and rub fastness can be produced. Further, by ensuring that the amount is not more than 20% by weight, any rapid increase in viscosity or solidification during drying of the ink can be suppressed, and discharge faults can be better suppressed.

Further, the ratio of the weight percentage of the pigment (A) relative to the weight percentage of the polymer compound (B), represented by WA/WB, is preferably at least 0.176 but not more than 1.500, and is more preferably at least 0.177 but not more than 1.400. With an aqueous ink having a ratio within the above range, the pigment (A) can be satisfactorily protected by the polymer compound (B) in the printed items, meaning printed items having excellent rub fastness can be produced.

The amount of the polymer compound (B) may be adjusted as desired provided the above conditions are satisfied, but the amount of the polymer compound (B) relative to the total weight of the ink is preferably from 3 to 15% by weight, more preferably from 4 to 10% by weight, and even more preferably from 5 to 8% by weight. By ensuring that the amount of the polymer compound (B) falls within this range, the suppression effect on discharge faults can be further enhanced.

In one embodiment, examples of the types of resins that can be used as the polymer compound (B) include acrylic-based resins, styrene/acrylic-based resins, urethane-based resins, styrene/butadiene-based resins, vinyl chloride-based resins and polyolefin-based resins. Any of these resins may be used alone, or a combination of 2 or more types of resin may be used. Among these resins, if consideration is given to achieving favorable storage stability for the ink and favorable rub fastness for the printed items, as well as ensuring a wide selection of materials that enables the affinity with the ethylene glycol and/or 1,3-propanediol (c1) to be adjusted as desired, then one or more types of materials selected from among acrylic-based resins, styrene/acrylic-based resins and urethane-based resins can be used particularly favorably. Further, there are no particular limitations on the structure of the resin, and for example, random structures, block structures, comb-like structures, and star-like structures and the like may be used as desired.

Furthermore, when the acid value of the polymer compound (B) is from 10 to 100 mgKOH/g, compounds used for any purpose may be used. However, polymer compounds such as hollow resin particles that can be used as the pigment (A) are excluded. Specifically, the polymer compound (B) may be used as a pigment dispersing resin, a binder resin, a wax, or an additive such as a thickener. Among these, in terms of enabling the printed items to be imparted with favorable rub fastness, the polymer compound (B) is preferably used as a binder resin and/or a wax. Use of the polymer compound (B) as a binder resin is particularly preferred.

<Water-Soluble Organic Solvent (C)>

As described above, in one embodiment of the present invention, a combination of the specified diol (c1) and the low-surface tension solvent (c2) is used. Further, the total of the blend amounts of these two solvents (WC1+WC2) is at least 10% by weight but not more than 40% by weight relative to the total weight of the ink. The value of WC1+WC2 is more preferably at least 15% by weight but not more than 35% by weight, and even more preferably at least 20% by weight but not more than 32% by weight. By ensuring that WC1+WC2 is at least 10% by weight, favorable wet spreadability of the aqueous ink on the printing substrate can be ensured, meaning printed items having no voids can be obtained. Further, by ensuring that WC1+WC2 is not more than 40% by weight, an ink having excellent drying properties can be obtained.

Further, in the ink of this embodiment, the weight ratio (WC2/WC1) of the amount of the low-surface tension solvent (c2) relative to the amount of the specified diol (c1) is from 1.5 to 5. By ensuring that the ratio between the two solvents falls within this range, the ethylene glycol and/or 1,3-propanediol (c1) has a favorable suppression effect on destruction of the dispersed and/or dissolved state, and as a result, an ink having excellent discharge properties and storage stability can be obtained. The value of WC2/WC1 is preferably from 2 to 4.5, and more preferably from 2.5 to 4.

Furthermore, as mentioned above, in the aqueous ink of one embodiment of the present invention, relating to the water-soluble organic solvent (C), the amount of water-soluble organic solvent having a boiling point at 1 atmosphere of 240° C. or higher is not more than 5% by weight relative to the total weight of the ink, and the weight average boiling point at 1 atmosphere of the water-soluble organic solvents contained in the ink is at least 180° C. but not more than 210° C. The amount of water-soluble organic solvent having a boiling point of 240° C. or higher is more preferably 3% by weight or less. The expression that the amount is "not more than 5% by weight" means that either the ink contains no water-soluble organic solvent having a boiling point of 240° C. or higher, or if it does contain such a solvent, the amount of that solvent is not more than 5% by weight.

Further, the weight average boiling point at 1 atmosphere for the water-soluble organic solvent (C) in the ink is more preferably at least 190° C. but not more than 200° C. By ensuring that these conditions are satisfied, an ink that exhibits excellent drying properties and image quality can be obtained. A low-surface tension solvent (c2) having a boiling point at 1 atmosphere of 240° C. or higher is included within the above description of "water-soluble organic solvent having a boiling point at 1 atmosphere of 240° C. or higher".

The boiling point at 1 atmosphere can be measured using conventional methods. Further, the weight average boiling point at 1 atmosphere for the water-soluble organic solvent (C) is the value obtained by multiplying the boiling point at 1 atmosphere for each water-soluble organic solvent by the weight ratio of that solvent relative to the total weight of the water-soluble organic solvent (C), and then adding the calculated values for the various solvents.

As already described above, the aqueous ink of embodiments of the present invention contains ethylene glycol and/or 1,3-propanediol (c1) as an essential component. One of these solvents may be used alone, or a combination of both solvents may be used. Among the various options, in terms of achieving higher hydrophilicity, and achieving a superior suppression effect on destruction of the dispersed and/or dissolved state of the pigment and the polymer compound, it is preferable that the ink contains at least ethylene glycol.

The blend amount of the specified diol (c1) in one embodiment of the present invention is preferably from 2 to 16% by weight, and more preferably from 5 to 13% by weight, relative to the total weight of the ink. By ensuring that the blend amount falls within this range, not only is a suppression effect obtained on destruction of the dispersed and/or dissolved state of the solid materials, but a further improvement in the drying properties of the ink droplets can be achieved, meaning printed items having particularly superior drying properties and image quality can be obtained.

The low-surface tension solvent (c2) used in embodiments of the present invention is a solvent having a static surface tension at 25° C. of 20 to 37 mN/m. This static surface tension is preferably from 20 to 35 mN/m, and more preferably from 20 to 33 mN/m. By ensuring that the static surface tension falls within the above range, favorable wet spreadability of the ink droplets on the substrate can be achieved, even when performing high-speed printing to low-absorption substrates, and printed items having excellent drying properties and image quality can be obtained. The static surface tension at 25° C. can be measured, for example, by performing a platinum plate wetting test at 25° C. in accordance with the Wilhelmy method. An example of the measurement apparatus is a CBVPZ device manufactured by Kyowa Interface Science Co., Ltd.

Specific examples of low-surface tension solvents (c2) that can be used favorably in embodiments of the present invention include propylene glycol, 1,2-butanediol, 1,2-pentanediol, 1,2-hexanediol, 3-ethyl-1,2-hexanediol, ethylene glycol monomethyl ether, diethylene glycol monomethyl ether, triethylene glycol monomethyl ether, ethylene glycol monoisopropyl ether, diethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monoallyl ether, diethylene glycol monobenzyl ether, dipropylene glycol, propylene glycol monomethyl ether, dipropylene glycol monomethyl ether, tripropylene glycol monomethyl ether, propylene glycol monopropyl ether, ethylene glycol dimethyl ether, diethylene glycol dimethyl ether, triethylene glycol dimethyl ether, diethylene glycol methyl ethyl ether, diethylene glycol diethyl ether, diethylene glycol monoethyl ether acetate, 3-methoxy-1-butanol, and 3-methoxy-3-methylbutanol. One of the above compounds may be used alone, or a combination of two or more types may be used.

In the present embodiment, of the solvents listed above, a solvent containing at least one type of solvent selected from the group consisting of 1,2-alkanediols such as propylene glycol, 1,2-butanediol, 1,2-pentanediol, 1,2-hexanediol, and 3-ethyl-1,2-hexanediol; diethylene glycol monoalkyl ethers such as diethylene glycol monomethyl ether, diethylene glycol monoisopropyl ether and diethylene glycol monobutyl ether; propylene glycol monoalkyl ethers such as propylene glycol monomethyl ether and propylene glycol monopropyl ether; and 3-methoxy-1-butanol and 3-methoxy-3-methylbutanol (3-methyl-3-methoxybutanol) can be used particularly favorably. Although the details are unclear, it is thought that because the above solvents are unlikely to destroy the dispersed and/or dissolved state of the pigment and the polymer compound, an ink having superior storage stability and discharge properties is obtained.

In one particular embodiment, among the solvents that can be used favorably listed above, the use of a 1,2-alkanediol as the low-surface tension solvent (c2) is preferred, and the use of a 1,2-alkanediol containing 3 to 6 carbon atoms is even more preferred. Among such solvents, the use of at least 1,2-butanediol, 1,2-pentanediol or 1,2-hexanediol is particularly desirable. In a 1,2-alkanediol, the hydroxyl groups that represent the hydrophilic units and the alkyl group that represents the hydrophobic unit are localized, meaning that while good affinity with water can be achieved, ensuring an improvement in the storage stability and discharge properties of the ink, the surface tension of the ink can also be lowered into the favorable range. It is thought that, as a result, the wet spreadability of the ink can be improved, and printed items having excellent image quality can be produced.

In one embodiment, the blend amount of the low-surface tension solvent (c2) relative to the total weight of the ink is preferably from 10 to 30% by weight, more preferably from 15 to 30% by weight, and even more preferably from 15 to 25% by weight. By ensuring the amount falls within this range, not only is an improvement in the wet spreadability of the ink achieved, but an ink with excellent suppression of discharge faults can be obtained without impairing the effect of the specified diol (c1) in suppressing destruction of the dispersed and/or dissolved state of the solid materials.

In the aqueous ink of one embodiment, other conventionally known water-soluble organic solvents besides the specified diol (c1) and the low-surface tension solvent (c2) may also be selected and used as desired. Examples of other water-soluble organic solvents besides the above two solvents that can be selected favorably include 2-methyl-1,3-propanediol, 1,3-butanediol, 1,4-butanediol, 1,5-pentanediol, 3-methyl-1,5-pentanediol, 1,6-hexanediol, glycerol, diethylene glycol, triethylene glycol, dipropylene glycol, 2-pyrrolidone, N-methylpyrrolidone, N-ethylpyrrolidone, and 3-methyl-2-oxazolidinone. When these organic solvents are used, they should be used in amounts that ensure that the aforementioned conditions relating to the amount of water-soluble organic solvent having a boiling point of 240° C. or higher and the weight average boiling point of the water-soluble organic solvent (C) are still satisfied. Moreover, these solvents are preferably used in a manner that does not impair the effects of the specified diol (c1) and the low-surface tension solvent (c2).

<Surfactant (D)>

In embodiments of the present invention, a surfactant (D) is used for the purpose of adjusting the surface tension, and ensuring favorable wet spreadability on the substrate, and particularly on low-absorption substrates. Various types of surfactants such as siloxane-based surfactants, acetylene-based surfactants, acrylic-based surfactants and fluorine-based surfactants are known as the surfactant (D) in accordance with the intended application. From the viewpoint of satisfactorily lowering the surface tension of the ink and ensuring excellent wet spreadability, the use of a siloxane-based surfactant and/or an acetylene-based surfactant is preferred, and of these, in terms of suppressing the coalescence of ink droplets on the printing substrate, thereby preventing color boundary bleeding and aggregation irregularities, the use of at least a siloxane-based surfactant is particularly preferred. The amount added of the surfactant, relative to the total weight of the ink, is preferably at least 0.5% by weight but not more than 5.5% by weight, more preferably at least 1% by weight but not more than 5% by weight, and even more preferably at least 2% by weight but not more than 4% by weight. By ensuring that the amount is at least 0.5% by weight, the surfactant function can be satisfactorily realized, whereas by ensuring that the amount is not more than 5.5% by weight, the storage stability and discharge properties of the ink can be maintained at favorable levels.

<Pigment Dispersing Resin>

In order to maintain good ink stability over a long period of time, the pigment (A) in embodiments of the present invention is used in a dispersed state within the ink. Examples of the method used for dispersing the pigment include methods of dispersing the pigment without a dispersant by modifying the surface of the pigment using an oxidation treatment or a resin coating or the like, and methods of dispersing the pigment using a surfactant or a resin as a dispersant. In one embodiment, in terms of enhancing the gloss of the printed items and obtaining an ink having excellent storage stability and discharge properties, the pigment (A) is preferably dispersed using a pigment dispersing resin.

In those cases where a pigment dispersing resin is used, a resin that corresponds with the polymer compound (B), namely a resin having an acid value of 10 to 100 mgKOH/g, may be used. However, for the reasons described below, the use of a resin having an acid value exceeding 100 mgKOH/g as the pigment dispersing resin is preferable, and therefore a resin that does not correspond with the polymer compound (B) is preferably selected as the pigment dispersing resin.

There are no particular limitations on the types of pigment dispersing resins that can be used, and examples include acrylic-based resins, styrene/acrylic-based resins, maleic acid-based resins, styrene/maleic acid-based resins, urethane-based resins, ester-based resins, amide-based resins and imide-based resins. Among these, from the viewpoint of achieving more powerful adsorption to the pigment (A), thereby better stabilizing the pigment dispersion, one or more types of resin selected from among acrylic-based resins, styrene/acrylic-based resins, urethane-based resins and ester-based resins is preferred. Further, there are no particular limitations on the structure of these resins, and for example, random structures, block structures, comb-like structures and star-like structures may all be used as desired.

Furthermore, the use of a pigment dispersing resin having an alkyl group of 10 to 36 carbon atoms within the resin skeleton is preferred from the viewpoint of the ink storage stability and the viewpoint of the compatibility with the low-surface tension solvent (c2). Examples of methods for synthesizing a resin having an alkyl group include a method that involves performing a condensation of an alcohol and/or an amine having an alkyl group with a functional group such as a carboxylic acid within the resin skeleton of the base structure, and a method that involves using a monomer having an alkyl group at the time of resin synthesis to synthesize a resin containing the alkyl group.

In terms of the molecular weight of the pigment dispersing resin, the weight average molecular weight is preferably within a range from at least 1,000 to not more than 100,000, and is more preferably at least 5,000 but not more than 50,000. By ensuring that the weight average molecular weight falls within the above range, the pigment (A) can be stably dispersed in water, and favorable discharge stability can be achieved. The weight average molecular weight of the pigment dispersing resin can be measured in the same manner as that described above for the polymer compound (B).

The acid value of the pigment dispersing resin is preferably greater than 100 mgKOH/g but not more than 400 mgKOH/g. When the acid value is greater than 100 mgKOH/g, the pigment dispersing resin can be more easily dissolved in the water that represents the main component, and the viscosity of the dispersion can be suppressed to a low level. Further, when the acid value is not higher than 400 mgKOH/g, unsatisfactory compatibility between the pigment dispersing resin and the low-surface tension solvent (c2) can be prevented, and the storage stability of the ink can be favorably maintained. The acid value of the pigment dispersing resin is preferably from 150 to 350 mgKOH/g. The acid value of the pigment dispersing resin can be measured in the same manner as that described above for the polymer compound (B).

In order to enhance the solubility in water, a pigment dispersing resin in which the acid groups within the resin have been neutralized with a base is preferred. Examples of bases that may be used include organic bases such as ammonia water, dimethylaminoethanol, diethanolamine and triethanolamine, and inorganic bases such as lithium hydroxide, sodium hydroxide and potassium hydroxide.

In those cases where a pigment dispersing resin is used, the amount of the pigment dispersing resin is preferably from 1 to 50% by weight relative to the weight of the pigment (A). By ensuring that the proportion of the pigment dispersing resin satisfies the above range, the viscosity of the pigment dispersion and the ink can be kept low, and the dispersibility and storage stability can be improved. The amount of the pigment dispersing resin relative to the pigment (A) is more preferably from 2 to 45% by weight, even more preferably from 3 to 40% by weight, and most preferably from 4 to 35% by weight.

<Water>

The water contained in the ink of an embodiment of the present invention is preferably not a typical water containing various ions, and the use of an ion-exchanged water (deionized water) is preferred. The amount of water in this embodiment is preferably at least 20% by weight but not more than 90% by weight relative to the total weight of the ink.

<Other Components>

Further, in an embodiment of the present invention, in order to obtain an ink having certain desired physical property values, additives such as antifoaming agents, pH modifiers and preservatives may be added besides the various components described above. The amount added of these additives is preferably at least 0.01% by weight but not more than 10% by weight relative to the total weight of the ink.

<Ink Set>

The ink of an embodiment of the present invention may be used for a single color, or depending on the application, may be used in an ink set by combining a plurality of colors. Although there are no particular limitations on the combination used, by using the three colors of cyan, yellow and magenta, full color images can be obtained. Further, by also including a black ink, the level of blackness can be improved, and the legibility of text and the like can be improved. Moreover, by also adding colors such as orange and green, the color reproducibility can be improved. When printing is performed to a non-white printing substrate, including a white ink enables more distinct images to be obtained.

In terms of achieving a superior effect for the specified diol (c1) in suppressing the destruction of the dispersed state, and enabling printed items of excellent image density and image quality to be obtained even when performing high-speed printing to low-absorption substrates, the use of a set containing a cyan ink that uses a cyan pigment selected from among C. I. Pigment Blue 15:3 and 15:4, a magenta ink that uses a magenta pigment selected from among C. I. Pigment Red 31, 122, 146, 147, 150, 185, 202, 209, 266 and 269, and C. I. Pigment Violet 19, and a yellow ink that uses a yellow pigment selected from among C. I. Pigment Yellow 14, 74, 120, 150 and 185 is preferred.

<Ink Preparation Method>

One example of a method for preparing an ink of an embodiment of the present invention containing the types of components described above is described below, but embodiments of the present invention are not limited to this particular method. First, the pigment (A), water and, if required, a pigment dispersing resin are mixed and stirred, and by subsequently performing a dispersion treatment using a dispersion device described below as required, or performing a centrifugal separation treatment as required, a pigment dispersion is obtained. During production of this pigment dispersion, a polymer compound (B) that does not correspond with the pigment dispersing resin, the water-soluble organic solvent (C) and/or the surfactant (D) may also be added if required. Subsequently, the polymer compound (B), the water-soluble organic solvent (C), the surfactant (D), and any other components that are required are added to the pigment dispersion. Stirring and mixing is then performed, under heating if necessary, and the resulting mixture is filtered to obtain an ink of an embodiment of the present invention.

When a dispersion treatment is performed to produce the pigment dispersion, the dispersion device used may be any typically used dispersion device, and examples include a ball mill, roll mill, sand mill, beads mill and nanomizer. Among these, a beads mill can be used particularly favorably.

From the viewpoint of improving the effect of the specified diol (c1) in suppressing destruction of the dispersed state, the pigment (A) contained in an ink of an embodiment of the present invention preferably has the following volume 50% diameter (d50) within the ink. In order to obtain a pigment (A) having this desired volume 50% diameter, for example, the following methods may be used: reducing the size of the grinding media in the aforementioned dispersion device, altering the material used for the grinding media, increasing the grinding media filling ratio, altering the shape of the stirring member (agitator), lengthening the dispersion treatment time, performing classification with a filter or a centrifugal separator or the like after the dispersion treatment, or a combination of these methods. In an embodiment of the present invention, in order to ensure that the pigment size falls within the preferred particle diameter range described below, the diameter of the grinding media in the above dispersion device is preferably from 0.1 to 3 mm. Further, examples of materials that can be used favorably as the grinding media include glass, zircon, zirconia and titania.

For the reasons described above, the volume 50% diameter of the pigment (A) in the ink according to an embodiment of the present invention is preferably from 20 to 400 nm, more preferably from 35 to 350 nm, and even more preferably from 50 to 300 nm. This volume 50% diameter represents the median diameter, and can be measured using a Nanotrac UPA EX-150 (manufactured by MicrotracBEL Corporation) using a sample of the ink that has been diluted with water.

<Method for Producing Printed Items>

A method for producing a printed item according to one embodiment of the present invention is a method for producing an aqueous inkjet ink printed item that has a step of discharging the aqueous inkjet ink of an embodiment described above from an inkjet head and adhering the aqueous inkjet ink to a printing substrate, and a step of drying the printing substrate with the adhered aqueous inkjet ink. The nozzle diameter of the inkjet head nozzles is preferably from 15 to 25 μm, and the design resolution of the inkjet head is preferably 600 dpi or higher.

Generally, the method used for printing an inkjet ink is a method in which the ink is discharged from the nozzles of an inkjet head, and the ink droplets are adhered to a printing substrate. The inkjet printers housing the inkjet head and used for the printing process can be broadly classified into two main types based on the printing system employed. One type is the "shuttle scan type" in which the head is moved back and forth over the printing substrate while discharging the ink, and the other type is a "line pass type" in which the position of the head that discharges the ink is fixed, and the printing substrate is passed beneath the head while the ink is discharged.

Compared with the shuttle scan type, line pass type printers are more capable of high-speed printing, and can be expected to act as effective replacements for existing high-speed printers such as offset printing devices. However, the flushing that is performed in shuttle scan type printers cannot be performed, and depending on the pattern being printed, nozzles from which ink is not discharged for a long time can occur, meaning discharge faults are more likely to occur than shuttle scan type systems.

In this manner, particularly in the case of line pass type printers, resolving this tradeoff between increased printing speed and suppression of discharge faults is an important issue.

Further, in relation to the inkjet head mounted in the inkjet printer, generally, the higher the design resolution for the head, the more the image quality of the printed items can be improved. In particular, by using a head having a design resolution of at least 600 dpi, printed items of excellent image quality can be produced. On the other hand, in order to achieve a design resolution for the inkjet head of at least 600 dpi, the spacing between adjacent nozzles is preferably about 42 μm or less, and the nozzle diameter is also preferably not more than this spacing. As the nozzle diameter is reduced, the volume of the discharged ink droplets decreases and the fine detail of the obtained image improves, but voids caused by unsatisfactory wet spreading of the ink droplets also tend to occur more readily. Further, the smaller the nozzle diameter becomes, the more likely that drying of a small amount of ink and subsequent adhesion may cause discharge faults.

In light of the above, and as a result of intensive investigation, the inventors of the present invention discovered that by installing the aqueous ink described above in an inkjet head having a nozzle diameter of 15 to 25 μm and a design resolution of at least 600 dpi, and then producing printed items, the problems outlined above could be satisfactorily resolved. In other words, in an aqueous ink containing the low-surface tension solvent (c2) and the surfactant (D), by restricting the amount of water-soluble organic solvent having a boiling point of 240° C. or higher and the weight average boiling point of the water-soluble organic solvent (C), the ink droplets are able to undergo satisfactory wet spreading, even on low-absorption substrates. As a result, printed items having no voids and no color boundary bleeding or aggregation irregularities, and having excellent image density and superior fine detail can be obtained. Moreover, by using an aqueous ink that combines the above materials with ethylene glycol and/or 1,3-propanediol (c1), the occurrence of drying and adhesion at the nozzle interface can be markedly suppressed, enabling printed items to be produced without discharge faults, even from heads having small nozzle diameters.

As described above, the design resolution of the inkjet head used in a method for producing printed items using the aqueous ink of an embodiment of the present invention is preferably from 600 to 1,600 dpi, and more preferably from 1,200 to 1,600 dpi. Further, the nozzle diameter of the inkjet head used in the printing is preferably from 15 to 25 μm, and more preferably from 15 to 20 μm. By using an inkjet head having a finer nozzle diameter, the discharge volume of the ink droplets can be reduced, and printed items having higher image quality and improved fine detail can be produced.

<Printing Substrate>

The ink of an embodiment of the present invention can be used particularly favorably on low-absorption substrates. The term "low-absorption substrate" means a recording medium that either absorbs no water or has a slow absorption rate, and specifically describes a substrate which has a water absorption coefficient, measured by Bristow's method (J. TAPPI paper pulp test method No. 51-87), of 0 to 0.6 ml/m$^2$ msec$^{1/2}$. This water absorption coefficient can be measured, for example, using an Auto Scan absorption meter manufactured by Kumagai Riki Kogyo Co., Ltd. Specifically, by using the above apparatus and water, a relationship plot is generated between the amount of water absorption (ml/m$^2$) in a contact time of 100 to 1,000 milliseconds and the square root of the contact time (msec$^{1/2}$), and the gradient of the straight line obtained by the least squares method is deemed to represent the absorption coefficient.

Specific examples of low-absorption substrates include, but are not limited to, paper substrates such as coated papers, art papers, cast papers, finely coated papers and synthetic papers; plastic substrates such as polyvinyl chloride, PET, polypropylene, polyethylene, nylon, polystyrene, foamed styrol, poly(methyl methacrylate) (PMMA), and polycarbonate; metal substrates such as aluminum and stainless steel; and glass. The inkjet ink of embodiments of the present invention can also be used favorably with printing substrates other than low-absorption substrates, including plain paper, fabrics and wooden materials. The surface of the substrate may be flat or uneven, and may be transparent, semi-transparent or opaque. Further, a substrate obtained by bonding together two or more types of these substrates may also be used. Furthermore, a releasable adhesive layer may be provided on the opposite side from the print surface, or an adhesive layer or the like may be provided on the printed surface following printing.

<Coating Treatment>

The printed item obtained by printing the aqueous ink of an embodiment of the present invention to a plastic substrate may, if necessary, be subjected to a coating treatment of the printed surface. Specific examples of this coating treatment include coating or printing of a coating composition, and lamination using a dry lamination method, solvent-free lamination method, extrusion lamination method or hot melt lamination method, and either of these techniques may be selected, or a combination of both may be used.

EXAMPLES

The present invention is described below in further detail using a series of examples and comparative examples. In the following description, unless particularly stated otherwise, "parts", "%" and "ratios" all represent weight-referenced values.

<Cyan Pigment Dispersion 1>

Twenty parts of LIONOGEN BLUE FG-7358G (C. I. Pigment Blue 15:3, manufactured by Toyo Color Co., Ltd.) as a pigment, 15 parts of an aqueous solution (non-volatile fraction: 20%) of a styrene/acrylic resin (a random copolymer in which styrene:acrylic acid:behenyl methacrylate=35:30:35 (weight ratio), molecular weight: 16,000, acid value: 250 mgKOH/g) as a pigment dispersing resin and 65 parts of water were mixed, and a preliminary dispersion treatment was performed using a Disper (stirrer). The aqueous solution of the styrene/acrylic resin was prepared using the method disclosed in Production Example 2 of the specification of JP 2012-188581 A.

Subsequently, the obtained mixture was subjected to a main dispersion treatment using a Dyno-Mill with a capacity of 0.6 L filled with 1,800 g of zirconia beads of diameter 0.5 mm, thus obtaining a cyan pigment dispersion 1.

In this description, the term "aqueous solution" describes a solution containing an aqueous solvent (a solvent that contains water) and a component that is dispersed and/or dissolved in that aqueous solvent.

<Yellow Pigment Dispersion 2>

With the exception of altering the pigment to LIONOL YELLOW TT-1405G (C. I. Pigment Yellow 14, manufactured by Toyo Color Co., Ltd.), the same method as the cyan pigment dispersion 1 was used to obtain a yellow pigment dispersion 2.

<Magenta Pigment Dispersion 3>

With the exception of altering the pigment to FASTOGEN Super Magenta RTS (C. I. Pigment Red 122, manufactured by DIC Corporation), the same method as the cyan pigment dispersion 1 was used to obtain a magenta pigment dispersion 3.

<Black Pigment Dispersion 4>

With the exception of altering the pigment to Printex 85 (carbon black, manufactured by Orion Engineered Carbons S.A.), the same method as the cyan pigment dispersion 1 was used to obtain a black pigment dispersion 4.

<Binder Resin 1 (Styrene/Acrylic Water-Soluble Resin) Production Example>

A reaction container fitted with a gas inlet tube, a thermometer, a condenser and a stirrer was charged with 93.4 parts of butanol, and the container was flushed with nitrogen gas. The contents of the reaction container were heated to 110° C., and a mixture containing 20 parts of styrene, 10 parts of methacrylic acid and 70 parts of methyl methacrylate as polymerizable monomers and 9 parts of V-601 (manufactured by Wako Pure Chemical Industries, Ltd.) as a polymerization initiator was added dropwise to the container over a period of two hours to achieve a polymerization reaction. Following completion of the dropwise addition, reaction was continued at 110° C. for a further three hours, an additional 0.9 parts of V-601 (manufactured by Wako Pure Chemical Industries, Ltd.) was then added, and the reaction was continued at 110° C. for a further one hour, thus obtaining a binder resin 1. Measurement of the binder resin 1 using an HLC-8120GPC manufactured by Tosoh Corporation revealed a weight average molecular weight of about 12,000 and a molecular weight distribution width of 2.3.

Following cooling of the binder resin 1 to room temperature, 37.1 parts of dimethylaminoethanol was added to neutralize the resin, and 100 parts of water was then added. Subsequently, the obtained solution was heated to at least 100° C., and the butanol was removed by azeotropic distillation with the water to adjust the solid fraction to 50%, thus obtaining an aqueous solution of the binder resin 1 (solid fraction: 50%). The acid value of the binder resin 1, which was measured and calculated using an automatic potentiometric titrator AT-710S manufactured by Kyoto Electronics Manufacturing Co., Ltd., was 65 mgKOH/g.

<Binder Resin 2 (Styrene/Acrylic Water-Soluble Resin) Production Example>

With the exceptions of using 10 parts of styrene, 2 parts of methacrylic acid, 10 parts of lauryl methacrylate and 78 parts of methyl methacrylate as the polymerizable monomers, and altering the amount of dimethylaminoethanol used for the neutralization to 8.0 parts, an aqueous solution of a binder resin 2 (solid fraction: 50%) was obtained in the same manner as the binder resin 1. Measurement in the same manner as the binder resin 1 revealed that the binder resin 2 had a weight average molecular weight of about 14,500 and an acid value of 13 mgKOH/g.

<Binder Resin 3 (Styrene/Acrylic Hydrosol) Production Example>

A reaction container fitted with a gas inlet tube, a thermometer, a condenser and a stirrer was charged with a mixture of 3 parts of methacrylic acid and 7 parts of methyl methacrylate as polymerizable monomers, 2.4 parts of V-65 (manufactured by Wako Pure Chemical Industries, Ltd.) as a polymerization initiator, 1.8 parts of 2-iodo-2-cyanopropane, 0.18 parts of 2-tert-butyl-4,6-dimethylphenol, and 103.5 parts of diethylene glycol dimethyl ether. Subsequently, the reaction container was flushed with nitrogen gas, the contents of the reaction container were then heated to 75° C., and a polymerization reaction was conducted across a period of 3 hours, thus obtaining a copolymer (A block) formed from methacrylic acid and methyl methacrylate.

Subsequently, a mixture of 11 parts of styrene, 75 parts of methyl methacrylate and 11 parts of stearyl methacrylate as polymerizable monomers, and 0.06 parts of V-65 (manufactured by Wako Pure Chemical Industries, Ltd.) as a polymerization initiator was added to the above reaction container, and the polymerization reaction was continued at 75° C. for 3 hours, thus obtaining a binder resin 3, which was an A-B block copolymer in which a copolymer (B block) formed from styrene, methyl methacrylate and stearyl methacrylate had been added to the A block. The weight average molecular weight of the binder resin 3, measured in the same manner as the binder resin 1, was about 19,000.

Following cooling of the solution of the binder resin 3 to room temperature, 12.3 parts of dimethylaminoethanol was added to neutralize the solution, and 100 parts of water was then added. The thus obtained solution was heated to at least 100° C. under reduced pressure, thereby removing the diethylene glycol dimethyl ether by distillation, and by subsequently adjusting the solid fraction to 30%, an aqueous solution of the binder resin 3 (solid fraction: 30%) was obtained. The acid value of the binder resin 3, measured in the same manner as the binder resin 1, was 18 mgKOH/g.

Moreover, the polymer compounds (B) used in the examples and comparative examples were as follows.
Joncryl 711
(an acrylic emulsion, manufactured by BASF Corporation, solid fraction: 42%, acid value: 100 mgKOH/g)
VINYBLAN 701
(a vinyl chloride emulsion, manufactured by Nissin Chemical Industry Co., Ltd., solid fraction: 30%, acid value: 46 mgKOH/g)
HARDLEN NZ-1004
(a non-chlorinated polyolefin emulsion, manufactured by Toyobo Co., Ltd., solid fraction: 30%, acid value: 28 mgKOH/g)
Joncryl 586
(an acrylic water-soluble resin, manufactured by BASF Corporation, acid value: 108 mgKOH/g)

In the case of the Joncryl 586, the method described below was used to produce a varnish, which was then used in the ink production. A reaction container fitted with a gas inlet tube, a thermometer, a condenser and a stirrer was charged with 20 parts of Joncryl 586, 3.45 parts of dimethylaminoethanol and 76.55 parts of water, and a neutralization was performed by stirring the mixture. One gram of the resulting mixture was sampled and dried by heating at 180° C. for 20 minutes to measure the non-volatile fraction, and water was then added to the remaining mixture to achieve a non-volatile fraction of 15%, thus obtaining a Joncryl 586 varnish having a non-volatile fraction of 15%.

The water-soluble organic solvents (C) used in the examples and comparative examples, and the abbreviations used in Tables 1 to 4 were as follows.

1,3-PD: 1,3-propanediol
(boiling point: 214° C., surface tension: 47.1 mN/m)
EG: ethylene glycol
(boiling point: 197° C., surface tension: 48.4 mN/m)
1,2-HexD: 1,2-hexanediol
(boiling point: 223° C., surface tension: 25.9 mN/m)
1,2-PenD: 1,2-pentanediol
(boiling point: 210° C., surface tension: 27.7 mN/m)
1,2-BD: 1,2-butanediol
(boiling point: 194° C., surface tension: 31.6 mN/m)
1,2-PG: propylene glycol
(boiling point: 188° C., surface tension: 35.1 mN/m)
MMB: 3-methyl-3-methoxybutanol
(boiling point: 174° C., surface tension: 29.7 mN/m)
PGM: propylene glycol monomethyl ether
(boiling point: 121° C., surface tension: 23.5 mN/m)
iPDG: diethylene glycol monoisopropyl ether
(boiling point: 207° C., surface tension: 29.9 mN/m)
BDG: diethylene glycol monobutyl ether
(boiling point: 230° C., surface tension: 27.9 mN/m)
3-ethyl-1,2-hexanediol
(boiling point: 244° C., surface tension: 31.2 mN/m)
NMP: N-methylpyrrolidone
(boiling point: 202° C., surface tension: 40.3 mN/m)
2-pyrrolidone
(boiling point: 245° C., surface tension: 45.0 mN/m)
Glycerol
(boiling point: 290° C., surface tension: 62.0 mN/m)

The surfactants (D) used in the examples and comparative examples were as follows.
TEGO Wet 280
(a siloxane-based surfactant, manufactured by Evonik Japan Co., Ltd.)
SILFACE 503A
(a siloxane-based surfactant, manufactured by Nissin Chemical Industry Co., Ltd.)
Surfynol 104
(an acetylenediol-based surfactant, manufactured by Nissin Chemical Industry Co., Ltd.)

<Production Example for Inks 1 (4 Colors Composed of Inks 1C, 1M, 1Y and 1K)>

First, 15.0 parts of the cyan pigment dispersion 1, 10.0 parts of the aqueous solution (solid fraction: 50%) of the binder resin 1 (solid fraction equivalent: 5.0 parts), 7.5 parts of 1,3-propanediol, 22.5 parts of 1,2-butanediol and 2.0 parts of TEGO Wet 280 were added sequentially to a mixing container, and sufficient water was then added to make the total ink amount up to 100 parts. The resulting mixture of these components was then stirred thoroughly until uniform using a Disper. Subsequently, the obtained mixture was filtered through a membrane filter having a pore size of 1 μm to remove coarse particles that can cause head blockages, thus obtaining an ink 1C.

With the exception of using the yellow pigment dispersion 2, the magenta pigment dispersion 3 and the black pigment dispersion 4 respectively instead of the above cyan pigment dispersion 1, inks 1Y, 1M and 1K were obtained in exactly the same manner as the ink 1C.

<Production Examples for Inks 2 to 82>

Using the formulations shown in Tables 1 to 4, the same method as the production example for the ink 1C was used to produce inks 2 to 82 (each including the four colors of C, Y, M and K>.

TABLE 1

| Ink | | Example 1 | Example 2 | Example 3 | Example 4 | Example 5 | Example 6 | Example 7 |
|---|---|---|---|---|---|---|---|---|
| Pigment (A) | Pigment dispersion (pigment concentration: 20%) | 15.0% | 17.5% | 20.0% | 30.0% | 35.0% | 20.0% | 20.0% |
| Polymer compound (B) * solid fraction equivalent values | Binder resin 1 (styrene/acrylic water-soluble resin) acid value: 65 mgKOH/g | 5.0% | 5.0% | 5.0% | 5.0% | 5.0% | 7.5% | 10.0% |
| | Binder resin 2 (styrene/acrylic water-soluble resin) acid value: 13 mgKOH/g | | | | | | | |
| | Binder resin 3 (styrene/acrylic hydrosol) acid value: 18 mgKOH/g | | | | | | | |
| | Joncryl 711 (acrylic emulsion) acid value: 100 mgKOH/g | | | | | | | |
| | VINYBLAN 701 (vinyl chloride emulsion) acid value: 46 mgKOH/g | | | | | | | |
| | HARDLEN NZ-1004 (unchlorinated polyolefin emulsion) acid value: 28 mgKOH/g | | | | | | | |
| Water-soluble organic solvent (C) | Specified diol (c1) 1,3-PD (surface tension: 47.1, boiling point: 214) | 7.5% | 7.5% | 7.5% | 7.5% | 7.5% | 7.5% | 7.5% |
| | EG (surface tension: 48.4, boiling point: 197) | | | | | | | |
| | Low-surface tension solvent (c2) 1,2-BD (surface tension: 31.6, boiling point: 194) | 22.5% | 22.5% | 22.5% | 22.5% | 22.5% | 22.5% | 22.5% |
| Surfactant (D) | TEGO Wet 280 | 2.0% | 2.0% | 2.0% | 2.0% | 2.0% | 2.0% | 2.0% |
| Weight average boiling point at 1 atmosphere for water-soluble organic solvent (C) (° C.) | | 199 | 199 | 199 | 199 | 199 | 199 | 199 |
| Formula values | (1) WA | 3.0 | 3.5 | 4.0 | 6.0 | 7.0 | 4.0 | 4.0 |
| | (2) WA + WB | 8.0 | 8.5 | 9.0 | 11.0 | 12.0 | 11.5 | 14.0 |
| | (3) WC1 + WC2 | 30.0 | 30.0 | 30.0 | 30.0 | 30.0 | 30.0 | 30.0 |
| | (4) WC1/(WA + WB) | 0.94 | 0.88 | 0.83 | 0.68 | 0.63 | 0.65 | 0.54 |
| | (5) WC2/WC1 | 3.00 | 3.00 | 3.00 | 3.00 | 3.00 | 3.00 | 3.00 |
| Evaluation results | Evaluation 1: Ink stability | AA | AA | AA | AA | AA | AA | AA |
| | Evaluation 2: Color development | B | A | AA | AA | A | AA | AA |
| | Evaluation 3: Solid portion voids | AA | AA | AA | AA | AA | AA | AA |
| | Evaluation 4: Color boundary bleeding | A | A | A | A | A | A | A |
| | Evaluation 5: Aggregation irregularities | AA | AA | AA | AA | AA | AA | AA |
| | Evaluation 6: Drying properties | AA | AA | AA | AA | AA | AA | AA |
| | Evaluation 7: Rub fastness | AA | AA | AA | AA | B | AA | AA |
| | Evaluation 8A: Intermittent dischargeability using printer Head A | AA | A | A | A | A | A | A |
| | Head B | AA | AA | AA | AA | AA | AA | B |
| | Evaluation 8B: Intermittent dischargeability using discharge evaluator Nozzle diameter: 40 μm | AA | AA | AA | AA | AA | AA | AA |
| | Nozzle diameter: 25 μm | A | A | A | A | A | A | A |
| | Nozzle diameter: 15 μm | A | A | A | A | A | A | A |
| | Evaluation 9: Nozzle blockages upon long standby Head A | A | A | A | A | A | A | A |
| | Head B | A | A | A | A | B | A | B |

TABLE 1-continued

| | Ink | | Example 8 | Example 9 | Example 10 |
|---|---|---|---|---|---|
| Pigment (A) | | Pigment dispersion (pigment concentration: 20%) | 20.0% | 20.0% | 20.0% |
| Polymer compound (B) * solid fraction equivalent values | | Binder resin 1 (styrene/acrylic water-soluble resin) acid value: 65 mgKOH/g | 5.0% | | |
| | | Binder resin 2 (styrene/acrylic water-soluble resin) acid value: 13 mgKOH/g | | | |
| | | Binder resin 3 (styrene/acrylic hydrosol) acid value: 18 mgKOH/g | | 5.0% | |
| | | Joncryl 711 (acrylic emulsion) acid value: 100 mgKOH/g | | | |
| | | VINYBLAN 701 (vinyl chloride emulsion) acid value: 46 mgKOH/g | | | 5.0% |
| | | HARDLEN NZ-1004 (unchlorinated polyolefin emulsion) acid value: 28 mgKOH/g | | | |
| Water-soluble organic solvent (C) | Specified diol (c1) | 1,3-PD (surface tension: 47.1, boiling point: 214) | 7.5% | 7.5% | 7.5% |
| | | EG (surface tension: 48.4, boiling point: 197) | | | |
| | Low-surface tension solvent (c2) | 1,2-BD (surface tension: 31.6, boiling point: 194) | 22.5% | 22.5% | 22.5% |
| Surfactant (D) | | TEGO Wet 280 | 2.0% | 2.0% | 2.0% |
| Weight average boiling point at 1 atmosphere for water-soluble organic solvent (C) (° C.) | | | 199 | 199 | 199 |
| Formula values | (1) WA | | 4.0 | 4.0 | 4.0 |
| | (2) WA + WB | | 9.0 | 9.0 | 9.0 |
| | (3) WC1 + WC2 | | 30.0 | 30.0 | 30.0 |
| | (4) WC1/(WA + WB) | | 0.83 | 0.83 | 0.83 |
| | (5) WC2/WC1 | | 3.00 | 3.00 | 3.00 |
| Evaluation results | Evaluation 1: Ink stability | | AA | AA | A |
| | Evaluation 2: Color development | | AA | AA | AA |
| | Evaluation 3: Solid portion voids | | AA | AA | AA |
| | Evaluation 4: Color boundary bleeding | | AA | AA | AA |
| | Evaluation 5: Aggregation irregularities | | A | A | A |
| | Evaluation 6: Drying properties | | AA | AA | AA |
| | Evaluation 7: Rub fastness | | A | AA | AA |
| | Evaluation 8A: Intermittent dischargeability using printer | Head A | A | AA | A |
| | | Head B | AA | AA | B |
| | Evaluation 8B: Intermittent dischargeability using discharge evaluator | Nozzle diameter: 40 μm | AA | AA | AA |
| | | Nozzle diameter: 25 μm | A | A | A |
| | | Nozzle diameter: 15 μm | A | A | A |
| | Evaluation 9: Nozzle blockages upon long standby | Head A | A | A | A |
| | | Head B | A | A | B |

TABLE 1-continued

| Ink | | | Example 11 | Example 12 | Example 13 | Example 14 | Example 15 | Example 16 | Example 17 |
|---|---|---|---|---|---|---|---|---|---|
| Pigment (A) | | Pigment dispersion (pigment concentration: 20%) | 20.0% | 20.0% | 20.0% | 20.0% | 20.0% | 20.0% | 20.0% |
| Polymer compound (B) | | Binder resin 1 (styrene/acrylic water-soluble resin) acid value: 65 mgKOH/g | | 7.5% | | | | | |
| * solid fraction equivalent values | | Binder resin 2 (styrene/acrylic water-soluble resin) acid value: 13 mgKOH/g | | | | | | | |
| | | Binder resin 3 (styrene/acrylic hydrosol) acid value: 18 mgKOH/g | | | | | | | |
| | | Joncryl 711 (acrylic emulsion) acid value: 100 mgKOH/g | | | | | | | |
| | | VINYBLAN 701 (vinyl chloride emulsion) acid value: 46 mgKOH/g | 5.0% | | 5.0% | 10.0% | 10.0% | 15.0% | 15.0% |
| | | HARDLEN NZ-1004 (unchlorinated polyolefin emulsion) acid value: 28 mgKOH/g | | 2.5% | | | | | |
| Water-soluble organic solvent (C) | Specified diol (c1) | 1,3-PD (surface tension: 47.1, boiling point: 214) | 7.5% | 7.5% | 7.5% | 7.5% | 7.5% | 7.5% | 7.5% |
| | | EG (surface tension: 48.4, boiling point: 197) | | | | | | | |
| | Low-surface tension solvent (c2) | 1,2-BD (surface tension: 31.6, boiling point: 194) | 22.5% | 22.5% | 22.5% | 22.5% | 22.5% | 22.5% | 22.5% |
| Surfactant (D) | | TEGO Wet 280 | 2.0% | 2.0% | 2.0% | 2.0% | 2.0% | 2.0% | 2.0% |
| Weight average boiling point at 1 atmosphere for water-soluble organic solvent (C) (° C.) | | | 199 | 199 | 199 | 199 | 195 | 199 | 195 |
| Formula values | (1) WA | | 4.0 | 4.0 | 4.0 | 4.0 | 4.0 | 4.0 | 4.0 |
| | (2) WA + WB | | 9.0 | 14.0 | 9.0 | 14.0 | 14.0 | 19.0 | 19.0 |
| | (3) WC1 + WC2 | | 30.0 | 30.0 | 30.0 | 30.0 | 30.0 | 30.0 | 30.0 |
| | (4) WC1/(WA + WB) | | 0.83 | 0.54 | 0.83 | 0.54 | 0.54 | 0.39 | 0.39 |
| | (5) WC2/WC1 | | 3.00 | 3.00 | 3.00 | 3.00 | 3.00 | 3.00 | 3.00 |
| Evaluation results | Evaluation 1: Ink stability | | AA | AA | AA | AA | AA | AA | AA |
| | Evaluation 2: Color development | | AA | AA | AA | AA | AA | AA | AA |
| | Evaluation 3: Solid portion voids | | AA | AA | AA | AA | AA | AA | AA |
| | Evaluation 4: Color boundary bleeding | | A | A | A | A | A | A | A |
| | Evaluation 5: Aggregation irregularities | | AA | AA | AA | AA | AA | AA | AA |
| | Evaluation 6: Drying properties | | AA | A | AA | AA | AA | AA | AA |
| | Evaluation 7: Rub fastness | | AA | A | AA | AA | AA | AA | AA |
| | Evaluation 8A: Intermittent dischargeability using printer | Head A | AA | AA | AA | AA | AA | AA | AA |
| | | Head B | AA | AA | AA | AA | AA | AA | AA |
| | Evaluation 8B: Intermittent dischargeability using discharge evaluator | Nozzle diameter: 40 μm | A | A | A | A | A | A | A |
| | | Nozzle diameter: 25 μm | AA | AA | AA | AA | AA | AA | AA |
| | | Nozzle diameter: 15 μm | A | A | A | A | A | B | A |
| | Evaluation 9: Nozzle blockages upon long standby | Head A | A | A | A | A | A | A | A |
| | | Head B | A | B | A | A | A | B | A |

TABLE 1-continued

| Ink | | Example 18 | Example 19 | Example 20 |
|---|---|---|---|---|
| Pigment (A) | Pigment dispersion (pigment concentration: 20%) | 20.0% | 20.0% | 20.0% |
| Polymer compound (B) | Binder resin 1 (styrene/acrylic water-soluble resin) acid value: 65 mgKOH/g | 5.0% | 5.0% | 5.0% |
| *solid fraction equivalent values | Binder resin 2 (styrene/acrylic water-soluble resin) acid value: 13 mgKOH/g | | | |
| | Binder resin 3 (styrene/acrylic hydrosol) acid value: 18 mgKOH/g | | | |
| | Joncryl 711 (acrylic emulsion) acid value: 100 mgKOH/g | | | |
| | VINYBLAN 701 (vinyl chloride emulsion) acid value: 46 mgKOH/g | | | |
| | HARDLEN NZ-1004 (unchlorinated polyolefin emulsion) acid value: 28 mgKOH/g | | | |
| Water-soluble organic solvent (C) | Specified diol (c1) 1,3-PD (surface tension: 47.1, boiling point: 214) | 2.5% | 3.8% | 5.0% |
| | Low-surface tension solvent (c2) EG (surface tension: 48.4, boiling point: 197) | 7.5% | 11.3% | 15.0% |
| | 1,2-BD (surface tension: 31.6, boiling point: 194) | | | |
| Surfactant (D) | TEGO Wet 280 | 2.0% | 2.0% | 2.0% |
| Weight average boiling point at 1 atmosphere for water-soluble organic solvent (C) (° C.) | | 195 | 195 | 195 |
| Formula values | (1) WA | 4.0 | 4.0 | 4.0 |
| | (2) WA + WB | 9.0 | 9.0 | 9.0 |
| | (3) WC1 + WC2 | 10.0 | 15.0 | 20.0 |
| | (4) WC1/(WA + WB) | 0.28 | 0.42 | 0.56 |
| | (5) WC2/WC1 | 3.00 | 3.00 | 3.00 |
| Evaluation results | Evaluation 1: Ink stability | AA | AA | AA |
| | Evaluation 2: Color development | AA | AA | AA |
| | Evaluation 3: Solid portion voids | AA | AA | AA |
| | Evaluation 4: Color boundary bleeding | AA | AA | AA |
| | Evaluation 5: Aggregation irregularities | A | A | A |
| | Evaluation 6: Drying properties | AA | AA | AA |
| | Evaluation 7: Rub fastness | AA | AA | AA |
| | Evaluation 8A: Intermittent dischargeability using printer Head A | A | AA | AA |
| | Head B | B | AA | AA |
| | Evaluation 8B: Intermittent dischargeability using discharge evaluator Nozzle diameter: 40 μm | AA | AA | AA |
| | Nozzle diameter: 25 μm | A | A | A |
| | Nozzle diameter: 15 μm | B | A | AA |
| | Evaluation 9: Nozzle blockages upon long standby Head A | A | A | A |
| | Head B | B | A | A |

TABLE 2

| Ink | | Example 21 21 | Example 22 22 | Example 23 23 | Example 24 24 | Example 25 25 | Example 26 26 | Example 27 27 |
|---|---|---|---|---|---|---|---|---|
| Pigment (A) | Pigment dispersion (pigment concentration: 20%) | 20.0% | 20.0% | 20.0% | 20.0% | 20.0% | 20.0% | 20.0% |
| Polymer compound (B) | Binder resin 1 (styrene/acrylic water-soluble resin) acid value: 65 mgKOH/g | 5.0% | 5.0% | 5.0% | 5.0% | 5.0% | 5.0% | 5.0% |
| Water-soluble organic solvent (C) | Specified diol (c1) 1,3-PD (surface tension: 47.1, boiling point: 214) | 5.0% | | | | | | |
| | EG (surface tension: 48.4, boiling point: 197) | | 10.0% | 12.5% | 15.0% | 7.5% | 7.5% | 7.5% |
| | 1,2-HexD (surface tension: 25.9, boiling point: 223) | | | | | | | |
| | 1,2-PenD (surface tension: 27.7, boiling point: 210) | | | | | | | |
| | Low-surface tension solvent (c2) 1,2-BD (surface tension: 31.6, boiling point: 194) | 22.5% | 22.5% | 22.5% | 22.5% | 25.0% | 30.0% | 15.0% |
| | 1,2-PG (surface tension: 35.1, boiling point: 188) | | | | | | | |
| | MMB (surface tension: 29.7, boiling point: 174) | | | | | | | |
| | PGM (surface tension: 23.5, boiling point: 121) | | | | | | | |
| | iPDG (surface tension: 29.9, boiling point: 207) | | | | | | | |
| | BDG (surface tension: 27.9, boiling point: 230) | | | | | | | |
| | Other solvents * 3-ethyl-1,2-hexanediol (surface tension: 31.2, boiling point: 244) | | | | | | | |
| | * 2-pyrrolidone (surface tension: 45, boiling point: 245) | | | | | | | |
| | * glycerol (surface tension: 62, boiling point: 290) | | | | | | | |
| Surfactant (D) | TEGO Wet 280 | 2.0% | 2.0% | 2.0% | 2.0% | 2.0% | 2.0% | 2.0% |
| Weight average boiling point at 1 atmosphere for water-soluble organic solvent (C) (° C.) | | 198 | 200 | 201 | 202 | 199 | 198 | 206 |
| Formula values | (1) WA | 4.0 | 4.0 | 4.0 | 4.0 | 4.0 | 4.0 | 4.0 |
| | (2) WA + WB | 9.0 | 9.0 | 9.0 | 9.0 | 9.0 | 9.0 | 9.0 |
| | (3) WC1 + WC2 | 27.5 | 32.5 | 35.0 | 37.5 | 32.5 | 37.5 | 30.0 |
| | (4) WC1/(WA + WB) | 0.56 | 1.11 | 1.39 | 1.67 | 0.83 | 0.83 | 0.83 |
| | (5) WC2/WC1 | 4.50 | 2.25 | 1.80 | 1.50 | 3.33 | 4.00 | 3.00 |
| Evaluation results | Evaluation 1: Ink stability | AA | AA | AA | AA | AA | AA | AA |
| | Evaluation 2: Color development | AA | AA | AA | AA | AA | AA | AA |
| | Evaluation 3: Solid portion voids | AA | AA | A | B | AA | AA | AA |
| | Evaluation 4: Color boundary bleeding | A | A | A | B | A | A | A |
| | Evaluation 5: Aggregation irregularities | AA | AA | AA | AA | AA | AA | AA |
| | Evaluation 6: Drying properties | AA | AA | AA | AA | AA | AA | AA |
| | Evaluation 7: Rub fastness | AA | A | A | A | A | A | A |
| | Evaluation 8A: Intermittent dischargeability using printer Head A | AA | AA | AA | AA | AA | AA | AA |
| | Evaluation 8B: Intermittent dischargeability using discharge evaluator Head B Nozzle diameter: 40 μm | B | A | A | B | A | B | B |
| | Nozzle diameter: 25 μm | AA | AA | AA | AA | AA | AA | AA |
| | Nozzle diameter: 15 μm | AA | AA | AA | AA | AA | AA | AA |
| | Evaluation 9: Nozzle blockages upon long standby Head A | A | A | A | A | A | A | A |
| | Head B | A | A | A | A | A | A | A |

TABLE 2-continued

| Ink | | | Example 28 | Example 29 | Example 30 | Example 31 | Example 32 |
|---|---|---|---|---|---|---|---|
| Pigment (A) | | Pigment dispersion (pigment concentration: 20%) | 20.0% | 20.0% | 20.0% | 20.0% | 20.0% |
| Polymer compound (B) | | Binder resin 1 (styrene/acrylic water-soluble resin) acid value: 65 mgKOH/g | 5.0% | 5.0% | 5.0% | 5.0% | 5.0% |
| Water-soluble organic solvent (C) | Specified diol (c1) | 1,3-PD (surface tension: 47.1, boiling point: 214) | 7.5% | 7.5% | 7.5% | 7.5% | |
| | | EG (surface tension: 48.4, boiling point: 197) | | | | | 10.0% |
| | | 1,2-HexD (surface tension: 25.9, boiling point: 223) | | | | | |
| | | 1,2-PenD (surface tension: 27.7, boiling point: 210) | | 2.5% | | | |
| | | 1,2-BD (surface tension: 31.6, boiling point: 194) | 7.5% | | | | |
| | | 1,2-PG (surface tension: 35.1, boiling point: 188) | 15.0% | 20.0% | | | |
| | | MMB (surface tension: 29.7, boiling point: 174) | | | | | |
| | | PGM (surface tension: 23.5, boiling point: 121) | | | | | |
| | | iPDG (surface tension: 29.9, boiling point: 207) | | | | | |
| | | BDG (surface tension: 27.9, boiling point: 230) | | | | | |
| | Low-surface tension solvent (c2) | * 3-ethyl-1,2-hexanediol (surface tension: 31.2, boiling point: 244) | | | 22.5% | 22.5% | 20.0% |
| | | * 2-pyrrolidone (surface tension: 45, boiling point: 245) | | | | | |
| | | * glycerol (surface tension: 62, boiling point: 290) | | | | | |
| Surfactant (D) | | TEGO Wet 280 | 2.0% | 2.0% | 2.0% | 2.0% | 2.0% |
| Weight average boiling point at 1 atmosphere for water-soluble organic solvent (C) (° C.) | | | 203 | 201 | 195 | 184 | 182 |
| Formula values | (1) WA | | 4.0 | 4.0 | 4.0 | 4.0 | 4.0 |
| | (2) WA + WB | | 9.0 | 9.0 | 9.0 | 9.0 | 9.0 |
| | (3) WC1 + WC2 | | 30.0 | 30.0 | 30.0 | 30.0 | 30.0 |
| | (4) WC1/(WA + WB) | | 0.83 | 0.83 | 0.83 | 0.83 | 1.11 |
| | (5) WC2/WC1 | | 3.00 | 3.00 | 3.00 | 3.00 | 2.00 |
| Evaluation results | Evaluation 1: Ink stability | | AA | AA | AA | B | A |
| | Evaluation 2: Color development | | AA | AA | AA | AA | AA |
| | Evaluation 3: Solid portion voids | | AA | AA | B | AA | AA |
| | Evaluation 4: Color boundary bleeding | | AA | A | A | A | A |
| | Evaluation 5: Aggregation irregularities | | A | A | B | AA | AA |
| | Evaluation 6: Drying properties | | AA | AA | AA | AA | AA |
| | Evaluation 7: Rub fastness | | AA | AA | AA | AA | AA |
| | Evaluation 8A: Intermittent dischargeability using printer | Head A | AA | AA | AA | A | A |
| | | Head B | A | A | A | B | B |
| | Evaluation 8B: Intermittent dischargeability using discharge evaluator | Nozzle diameter: 40 μm | A | A | A | A | AA |
| | | Nozzle diameter: 25 μm | A | A | A | B | A |
| | | Nozzle diameter: 15 μm | | | | B | B |
| | Evaluation 9: Nozzle blockages upon long standby | Head A | | | | A | A |
| | | Head B | | | | B | B |

TABLE 2-continued

| Ink | | | Example 33 | Example 34 | Example 35 | Example 36 | Example 37 | Example 38 | Example 39 |
|---|---|---|---|---|---|---|---|---|---|
| Pigment (A) | | Pigment dispersion (pigment concentration: 20%) | 20.0% | 20.0% | 20.0% | 20.0% | 20.0% | 20.0% | 20.0% |
| Polymer compound (B) | | Binder resin 1 (styrene/acrylic water-soluble resin) acid value: 65 mgKOH/g | 5.0% | 5.0% | 5.0% | 5.0% | 5.0% | 5.0% | 5.0% |
| Water-soluble organic solvent (C) | Specified diol (c1) | 1,3-PD (surface tension: 47.1, boiling point: 214) | 7.5% | 7.5% | | 7.5% | | 7.5% | 7.5% |
| | | EG (surface tension: 48.4, boiling point: 197) | | | 7.5% | | 7.5% | | |
| | | 1,2-HexD (surface tension: 25.9, boiling point: 223) | | | | | | | |
| | | 1,2-PenD (surface tension: 27.7, boiling point: 210) | | | | | | | |
| | | 1,2-BD (surface tension: 31.6, boiling point: 194) | 15.0% | | | 15.0% | 15.0% | 17.5% | 17.0% |
| | | 1,2-PG (surface tension: 35.1, boiling point: 188) | | | | | | | |
| | | MMB (surface tension: 29.7, boiling point: 174) | | | | | | | |
| | Low-surface tension solvent (c2) | PGM (surface tension: 23.5, boiling point: 121) | 7.5% | 22.5% | 22.5% | 7.5% | | | |
| | | iPDG (surface tension: 29.9, boiling point: 207) | | | | | 7.5% | | |
| | | BDG (surface tension: 27.9, boiling point: 230) | | | | | | | |
| | | * 3-ethyl-1,2-hexanediol (surface tension: 31.2, boiling point: 244) | | | | | | | |
| | Other solvents | * 2-pyrrolidone (surface tension: 45, boiling point: 245) | | | | | | | |
| | | * glycerol (surface tension: 62, boiling point: 290) | | | | | | 5.0% | |
| Surfactant (D) | | TEGO Wet 280 | 2.0% | 2.0% | 2.0% | 2.0% | 2.0% | 2.0% | 0.5% |
| Weight average boiling point at 1 atmosphere for water-soluble organic solvent (C) (° C.) | | | 181 | 209 | 205 | 199 | 195 | 205 | 2.0% 205 |
| Formula values | (1) WA | | 4.0 | 4.0 | 4.0 | 4.0 | 4.0 | 4.0 | 4.0 |
| | (2) WA + WB | | 9.0 | 9.0 | 9.0 | 9.0 | 9.0 | 9.0 | 9.0 |
| | (3) WC1 + WC2 | | 30.0 | 30.0 | 30.0 | 30.0 | 30.0 | 30.0 | 30.0 |
| | (4) WC1/(WA + WB) | | 0.83 | 0.83 | 0.83 | 0.83 | 0.83 | 0.83 | 0.83 |
| | (5) WC2/WC1 | | 3.00 | 3.00 | 3.00 | 3.00 | 3.00 | 3.00 | 3.00 |
| Evaluation results | Evaluation 1: Ink stability | | A | B | B | A | A | A | B |
| | Evaluation 2: Color development | | AA | AA | AA | AA | AA | AA | AA |
| | Evaluation 3: Solid portion voids | | AA | AA | AA | A | A | A | A |
| | Evaluation 4: Color boundary bleeding | | AA | AA | AA | A | A | A | A |
| | Evaluation 5: Aggregation irregularities | | A | B | B | AA | AA | AA | AA |
| | Evaluation 6: Drying properties | | AA | AA | AA | AA | AA | B | B |
| | Evaluation 7: Rub fastness | | AA | AA | AA | AA | AA | AA | AA |
| | Evaluation 8A: Intermittent dischargeability using printer | Head A | B | A | A | A | A | A | A |
| | | Head B | B | B | B | AA | AA | AA | AA |
| | Evaluation 8B: Intermittent dischargeability using discharge evaluator | Nozzle diameter: 40 μm | A | A | A | A | A | A | A |
| | | Nozzle diameter: 25 μm | B | B | B | AA | AA | AA | AA |
| | | Nozzle diameter: 15 μm | B | B | B | A | A | A | A |
| | Evaluation 9: Nozzle blockages upon long standby | Head A | A | B | A | A | A | A | A |
| | | Head B | B | B | B | A | A | A | A |

TABLE 2-continued

| Ink | | | Example 40 | Example 41 | Example 42 | Example 43 | Example 44 |
|---|---|---|---|---|---|---|---|
| Pigment (A) | | Pigment dispersion (pigment concentration: 20%) | 20.0% | 20.0% | 20.0% | 20.0% | 20.0% |
| Polymer compound (B) | | Binder resin 1 (styrene/acrylic water-soluble resin) acid value: 65 mgKOH/g | 5.0% | 5.0% | 5.0% | 5.0% | 5.0% |
| Water-soluble organic solvent (C) | Specified diol (c1) | 1,3-PD (surface tension: 47.1, boiling point: 214) | 7.5% | 7.5% | | 7.5% | 7.5% |
| | | EG (surface tension: 48.4, boiling point: 197) | | | | | |
| | | 1,2-HexD (surface tension: 25.9, boiling point: 223) | | | | | |
| | Low-surface tension solvent (c2) | 1,2-PenD (surface tension: 27.7, boiling point: 210) | 5.0% | | | | |
| | | 1,2-BD (surface tension: 31.6, boiling point: 194) | 17.0% | 17.5% | | 17.5% | 17.5% |
| | | 1,2-PG (surface tension: 35.1, boiling point: 188) | | | | | |
| | | MMB (surface tension: 29.7, boiling point: 174) | | | | | |
| | | PGM (surface tension: 23.5, boiling point: 121) | | | | | |
| | | iPDG (surface tension: 29.9, boiling point: 207) | | | | | |
| | | BDG (surface tension: 27.9, boiling point: 230) | | | | | |
| | | * 3-ethyl-1,2-hexanediol (surface tension: 31.2, boiling point: 244) | 0.5% | | | | |
| | | * 2-pyrrolidone (surface tension: 45, boiling point: 245) | | 2.5% | 2.5% | 5.0% | 2.5% |
| | Other solvents | * glycerol (surface tension: 62, boiling point: 290) | | | 7.5% | | |
| Surfactant (D) | | TEGO Wet 280 | 2.0% | 2.0% | 2.0% | 2.0% | 2.0% |
| Weight average boiling point at 1 atmosphere for water-soluble organic solvent (C) (° C.) | | | 200 | 204 | 199 | 208 | 208 |
| Formula values | (1) WA | | 4.0 | 4.0 | 4.0 | 4.0 | 4.0 |
| | (2) WA + WB | | 9.0 | 9.0 | 9.0 | 9.0 | 9.0 |
| | (3) WC1 + WC2 | | 30.0 | 25.0 | 25.0 | 25.0 | 25.0 |
| | (4) WC1/(WA + WB) | | 0.83 | 0.83 | 0.83 | 0.83 | 0.83 |
| | (5) WC2/WC1 | | 3.00 | 2.33 | 2.33 | 2.33 | 2.33 |
| Evaluation results | Evaluation 1: Ink stability | | B | AA | AA | AA | AA |
| | Evaluation 2: Color development | | AA | AA | AA | AA | AA |
| | Evaluation 3: Solid portion voids | | AA | AA | AA | A | AA |
| | Evaluation 4: Color boundary bleeding | | AA | A | A | A | AA |
| | Evaluation 5: Aggregation irregularities | | A | A | A | A | AA |
| | Evaluation 6: Drying properties | | AA | AA | AA | AA | AA |
| | Evaluation 7: Rub fastness | | AA | AA | AA | AA | AA |
| | Evaluation 8A: Intermittent dischargeability using printer | Head A | A | A | A | A | A |
| | | Head B | AA | AA | AA | B | B |
| | Evaluation 8B: Intermittent dischargeability using discharge evaluator | Nozzle diameter: 40 μm | AA | AA | AA | AA | AA |
| | | Nozzle diameter: 25 μm | AA | AA | AA | AA | AA |
| | | Nozzle diameter: 15 μm | A | A | A | A | B |
| | Evaluation 9: Nozzle blockages upon long standby | Head A | A | A | A | A | A |
| | | Head B | A | A | A | A | A |

* Water-soluble organic solvents marked with this symbol correspond with water-soluble organic solvents having a boiling point of 240° C. or higher

TABLE 3

| | | Example 45 | Example 46 | Example 47 | Example 48 | Example 49 | Example 50 | Example 51 |
|---|---|---|---|---|---|---|---|---|
| Ink | Pigment (A) | Pigment dispersion (pigment concentration: 20%) | | | | | | |
| | | 20.0% | 20.0% | 20.0% | 20.0% | 20.0% | 20.0% | 20.0% |
| | Polymer compound (B) | Binder resin 1 (styrene/acrylic water-soluble resin) acid value: 65 mgKOH/g | | | | | | |
| | | 5.0% | 5.0% | 5.0% | 5.0% | 5.0% | 5.0% | 5.0% |
| | Water-soluble organic solvent (C) | Specified diol (c1) | 1,3-PD (surface tension: 47.1, boiling point: 214) | | | | | | |
| | | 7.5% | 7.5% | 7.5% | 7.5% | 7.5% | 7.5% | 7.5% |
| | | | EG (surface tension: 48.4, boiling point: 197) | | | | | | |
| | | Low-surface tension solvent (c2) | 1,2-HexD (surface tension: 25.9, boiling point: 223) | | | | | | |
| | | | 22.5% | 22.5% | 22.5% | 22.5% | 22.5% | 22.5% | 22.5% |
| | | | 1,2-BD (surface tension: 31.6, boiling point: 194) | | | | | | |
| | Surfactant (D) | TEGO Wet 280 | 0.3% | 0.5% | 1.0% | 4.0% | 5.0% | 5.5% | 6.0% |
| | | SILFACE 503A | | | | | | | |
| | | Surfynol 104 | | | | | | | |
| | Weight average boiling point at 1 atmosphere for water-soluble organic solvent (C) (° C.) | | 199 | 199 | 199 | 199 | 199 | 199 | 199 |
| Formula values | (1) WA | | 4.0 | 4.0 | 4.0 | 4.0 | 4.0 | 4.0 | 4.0 |
| | (2) WA + WB | | 9.0 | 9.0 | 9.0 | 9.0 | 9.0 | 9.0 | 9.0 |
| | (3) WC1 + WC2 | | 30.0 | 30.0 | 30.0 | 30.0 | 30.0 | 30.0 | 30.0 |
| | (4) WC1/(WA + WB) | | 0.83 | 0.83 | 0.83 | 0.83 | 0.83 | 0.83 | 0.83 |
| | (5) WC2/WC1 | | 3.00 | 3.00 | 3.00 | 3.00 | 3.00 | 3.00 | 3.00 |
| Evaluation results | Evaluation 1: Ink stability | | AA | AA | AA | AA | AA | A | B |
| | Evaluation 2: Color development | | AA | AA | AA | AA | AA | AA | AA |
| | Evaluation 3: Solid portion voids | | B | B | A | AA | AA | AA | AA |
| | Evaluation 4: Color boundary bleeding | | B | A | AA | A | A | A | A |
| | Evaluation 5: Aggregation irregularities | | AA | AA | AA | AA | AA | AA | AA |
| | Evaluation 6: Drying properties | | AA | AA | AA | AA | AA | AA | AA |
| | Evaluation 7: Rub fastness | | AA | AA | AA | AA | AA | AA | AA |
| | Evaluation 8A: Intermittent dischargeability using printer | Head A | AA | AA | AA | AA | AA | AA | AA |
| | | Head B | A | A | A | A | A | A | A |
| | Evaluation 8B: Intermittent dischargeability using discharge evaluator | Nozzle diameter: 40 μm | A | A | A | A | A | A | A |
| | | Nozzle diameter: 25 μm | | | | | | B | B |
| | | Nozzle diameter: 15 μm | | | | | | | |
| | Evaluation 9: Nozzle blockages upon long standby | Head A | A | A | A | A | A | A | A |
| | | Head B | A | A | A | A | A | A | A |

| | | Example 52 | Example 53 | Example 54 |
|---|---|---|---|---|
| Ink | Pigment (A) | Pigment dispersion (pigment concentration: 20%) | | |
| | | 20.0% | 20.0% | 20.0% |
| | Polymer compound (B) | Binder resin 1 (styrene/acrylic water-soluble resin) acid value: 65 mgKOH/g | | |
| | | 5.0% | 5.0% | 5.0% |
| | Water-soluble organic solvent (C) | Specified diol (c1) | 1,3-PD (surface tension: 47.1, boiling point: 214) | | |
| | | 7.5% | 7.5% | 7.5% |
| | | | EG (surface tension: 48.4, boiling point: 197) | | |
| | | Low-surface tension solvent (c2) | 1,2-HexD (surface tension: 25.9, boiling point: 223) | | |
| | | | 22.5% | 22.5% | 22.5% |
| | | | 1,2-BD (surface tension: 31.6, boiling point: 194) | | |
| | Surfactant (D) | TEGO Wet 280 | 0.3% | 0.5% | 1.0% |
| | | SILFACE 503A | | | |
| | | Surfynol 104 | | | |
| | Weight average boiling point at 1 atmosphere for water-soluble organic solvent (C) (° C.) | | 195 | 195 | 195 |
| Formula values | (1) WA | | 4.0 | 4.0 | 4.0 |

TABLE 3-continued

| | | | Example 55 | Example 56 | Example 57 | Example 58 | Example 59 | Example 60 | Example 61 | Example 62 |
|---|---|---|---|---|---|---|---|---|---|---|
| Ink | Pigment (A) | Pigment dispersion (pigment concentration: 20%) | 20.0% | 20.0% | 20.0% | 20.0% | 20.0% | 20.0% | 20.0% | 20.0% |
| | Polymer compound (B) | Binder resin 1 (styrene/acrylic water-soluble resin) acid value: 65 mgKOH/g | 5.0% | 5.0% | 5.0% | 5.0% | 5.0% | 5.0% | 5.0% | 5.0% |
| | Water-soluble organic solvent (C) | Specified diol (c1) | 1,3-PD (surface tension: 47.1, boiling point: 214) | 7.5% | 7.5% | 7.5% | 7.5% | 7.5% | 5.0% | 7.5% | 10.0% |
| | | | EG (surface tension: 48.4, boiling point: 197) | | | | | | | | |
| | | Low-surface tension solvent (c2) | 1,2-HexD (surface tension: 25.9, boiling point: 223) | 22.5% | 22.5% | 22.5% | 22.5% | 22.5% | 22.5% | 22.5% | 22.5% |
| | | | 1,2-BD (surface tension: 31.6, boiling point: 194) | | | | | | | | |
| | Surfactant (D) | TEGO Wet 280 | 5.0% | 2.0% | 2.0% | 2.0% | 2.0% | 2.0% | 2.0% | 2.0% |
| | | SILFACE 503A | | | | | | | | |
| | | Surfynol 104 | | | | | | | | |
| Weight average boiling point at 1 atmosphere for water-soluble organic solvent (C) (° C.) | | | 195 | 199 | 195 | 199 | 195 | 195 | 195 | 195 |
| Formula values | (1) WA | | 4.0 | 4.0 | 4.0 | 4.0 | 4.0 | 4.0 | 4.0 | 4.0 |
| | (2) WA + WB | | 9.0 | 9.0 | 9.0 | 9.0 | 9.0 | 9.0 | 9.0 | 9.0 |
| | (3) WC1 + WC2 | | 30.0 | 30.0 | 30.0 | 30.0 | 30.0 | 27.5 | 30.0 | 32.5 |
| | (4) WC1/(WA + WB) | | 0.83 | 0.83 | 0.83 | 0.83 | 0.83 | 0.56 | 0.83 | 1.11 |
| | (5) WC2/WC1 | | 3.00 | 3.00 | 3.00 | 3.00 | 3.00 | 4.50 | 3.00 | 2.25 |
| Evaluation results | Evaluation 1: Ink stability | | A | AA | AA | AA | AA | AA | AA | AA |
| | Evaluation 2: Color development | | AA | AA | AA | AA | AA | AA | AA | AA |
| | Evaluation 3: Solid portion voids | | AA | AA | AA | AA | AA | B | B | A |
| | Evaluation 4: Color boundary bleeding | | A | A | A | A | A | B | A | A |
| | Evaluation 5: Aggregation irregularities | | AA | AA | AA | AA | AA | AA | AA | AA |
| | Evaluation 6: Drying properties | | AA | AA | AA | AA | AA | AA | AA | AA |
| | Evaluation 7: Rub fastness | | AA | AA | AA | AA | AA | AA | AA | AA |
| | Evaluation 8A: Intermittent dischargeability using printer | Head A | AA | AA | AA | AA | AA | AA | AA | AA |
| | | Head B | AA | AA | AA | AA | AA | AA | AA | AA |
| | Evaluation 8B: Intermittent dischargeability using discharge evaluator | Nozzle diameter: 40 μm | AA | AA | AA | AA | AA | AA | AA | AA |
| | | Nozzle diameter: 25 μm | AA | AA | AA | AA | AA | AA | AA | AA |
| | | Nozzle diameter: 15 μm | A | A | A | A | A | A | A | A |
| | Evaluation 9: Nozzle blockages upon long standby | Head A | A | A | A | A | A | A | A | A |
| | | Head B | A | A | A | A | A | A | A | A |

TABLE 3-continued

| | Ink | | Example 63 |
|---|---|---|---|
| Pigment (A) | Pigment dispersion (pigment concentration: 20%) | | 20.0% |
| Polymer compound (B) | Binder resin 1 (styrene/acrylic water-soluble resin) acid value: 65 mgKOH/g | | 5.0% |
| Water-soluble organic solvent (C) | Specified diol (c1) | 1,3-PD (surface tension: 47.1, boiling point: 214) | 7.5% |
| | | EG (surface tension: 48.4, boiling point: 197) | 5.0% |
| | Low-surface tension solvent (c2) | 1,2-HexD (surface tension: 25.9, boiling point: 223) | 17.5% |
| | | 1,2-BD (surface tension: 31.6, boiling point: 194) | 2.0% |
| Surfactant (D) | TEGO Wet 280 | | |
| | SILFACE 503A | | |
| | Surfynol 104 | | |
| Weight average boiling point at 1 atmosphere for water-soluble organic solvent (C) (° C.) | | | 200 |
| Formula values | (1) WA | | 4.0 |
| | (2) WA + WB | | 9.0 |
| | (3) WC1 + WC2 | | 30.0 |
| | (4) WC1/(WA + WB) | | 0.83 |
| | (5) WC2/WC1 | | 3.00 |
| Evaluation results | Evaluation 1: Ink stability | | AA |
| | Evaluation 2: Color development | | AA |
| | Evaluation 3: Solid portion voids | | AA |
| | Evaluation 4: Color boundary bleeding | | AA |
| | Evaluation 5: Aggregation irregularities | | AA |
| | Evaluation 6: Drying properties | | AA |
| | Evaluation 7: Rub fastness | | AA |
| | Evaluation 8A: Intermittent dischargeability using printer | Head A | AA |
| | | Head B | AA |
| | Evaluation 8B: Intermittent dischargeability using discharge evaluator | Nozzle diameter: 40 μm | AA |
| | | Nozzle diameter: 25 μm | AA |
| | | Nozzle diameter: 15 μm | AA |
| | Evaluation 9: Nozzle blockages upon long standby | Head A | A |
| | | Head B | A |

TABLE 4

| Ink | | Comparative Example 1 64 | Comparative Example 2 65 | Comparative Example 3 66 | Comparative Example 4 67 | Comparative Example 5 68 | Comparative Example 6 69 | Comparative Example 7 70 |
|---|---|---|---|---|---|---|---|---|
| Pigment (A) | Pigment dispersion (pigment concentration: 20%) | 10.0% | 40.0% | 15.0% | 20.0% | 20.0% | 20.0% | 20.0% |
| Polymer compound (B) * solid fraction amount | Binder resin 1 (styrene/acrylic water-soluble resin) acid value: 65 mgKOH/g | 5.0% | 5.0% | 2.5% | | | 5.0% | 5.0% |
| | Joncryl 586 (acrylic water-soluble resin) acid value: 108 mgKOH/g | 7.5% | 7.5% | 7.5% | | 7.5% | | |
| | VINYBLAN 701 (vinyl chloride emulsion) acid value: 46 mgKOH/g | | | | 5.0% | 20.0% | | 2.5% |
| Water-soluble organic solvent (C) | Specified diol (c1) | | | | | | | |
| | 1,3-PD (surface tension: 47.1, boiling point: 214) | | | | | | | |
| | EG (surface tension: 48.4, boiling point: 197) | | | | | | | |
| | Low-surface tension solvent (c2) | | | | | | | |
| | 1,2-HexD (surface tension: 25.9, boiling point: 223) | | | | | | | |
| | 1,2-BD (surface tension: 31.6, boiling point: 194) | 22.5% | 22.5% | 22.5% | 22.5% | 22.5% | 22.5% | 22.5% |
| | PGM (surface tension: 23.5, boiling point: 121) | | | | | | | |
| | NMP (surface tension: 40.3, boiling point: 202) | | | | | | | |
| | Other solvents | | | | | | | |
| | * 2-pyrroidone (surface tension: 45, boiling point: 245) | | | | | | | |
| | * glycerol (surface tension: 62, boiling point: 290) | | | | | | | |
| Surfactant (D) | TEGO Wet 280 | 2.0% | 2.0% | 2.0% | 2.0% | 2.0% | 2.0% | 2.0% |
| Weight average boiling point at 1 atmosphere for water-soluble organic solvent (C) (° C.) | | 199 | 199 | 199 | 199 | 199 | 194 | 196 |
| Formula values | (1) WA | 2.0 | 8.0 | 3.0 | 4.0 | 4.0 | 4.0 | 4.0 |
| | (2) WA + WB | 7.0 | 13.0 | 5.5 | 9.0 | 24.0 | 9.0 | 9.0 |
| | (3) WC1 + WC2 | 30.0 | 30.0 | 30.0 | 30.0 | 30.0 | 22.5 | 25.0 |
| | (4) WC1/(WA + WB) | 1.07 | 0.58 | 1.36 | 0.83 | 0.31 | 0.00 | 0.28 |
| | (5) WC2/WC1 | 3.00 | 3.00 | 3.00 | 3.00 | 3.00 | — | 9.00 |
| Evaluation results | Evaluation 1: Ink stability | AA | AA | AA | B | AA | AA | AA |
| | Evaluation 2: Color development | C | C | B | AA | AA | AA | AA |
| | Evaluation 3: Solid portion voids | AA | AA | AA | AA | AA | AA | AA |
| | Evaluation 4: Color boundary bleeding | AA | AA | AA | AA | AA | AA | AA |
| | Evaluation 5: Aggregation irregularities | A | A | A | A | A | A | A |
| | Evaluation 6: Drying properties | AA | AA | AA | AA | B | AA | AA |
| | Evaluation 7: Rub fastness | AA | C | C | C | C | B | B |
| | Evaluation 8A: Intermittent dischargeability using printer Head A | AA | B | AA | B | B | B | A |
| | Head B | AA | A | AA | AA | A | B | B |
| | Evaluation 8B: Intermittent dischargeability using discharge evaluator Nozzle diameter: 40 μm | AA | A | AA | AA | B | B | A |
| | Nozzle diameter: 25 μm | AA | C | AA | C | C | C | C |
| | Nozzle diameter: 15 μm | A | B | A | B | C | C | B |
| | Evaluation 9: Nozzle blockages upon long standby Head A | A | B | A | B | C | C | B |
| | Head B | A | C | A | C | C | C | C |

| Ink | | Comparative Example 8 71 | Comparative Example 9 72 | Comparative Example 10 73 |
|---|---|---|---|---|
| Pigment (A) | Pigment dispersion (pigment concentration: 20%) | 20.0% | 20.0% | 20.0% |
| Polymer compound (B) * solid fraction amount | | 5.0% | 5.0% | 5.0% |

Pigment dispersion (pigment concentration: 20%)
Binder resin 1 (styrene/acrylic water-soluble resin) acid value: 65 mgKOH/g
Joncryl 586 (acrylic water-soluble resin) acid value: 108 mgKOH/g TABLE 4-continued

| | | | Comparative Example 11 74 | Comparative Example 12 75 | Comparative Example 13 76 | Comparative Example 14 77 | Comparative Example 15 78 | Comparative Example 16 79 | Comparative Example 17 80 |
|---|---|---|---|---|---|---|---|---|---|
| Pigment (A) | | Pigment dispersion (pigment concentration: 20%) | 20.0% | 20.0% | 20.0% | 20.0% | 20.0% | 20.0% | 20.0% |
| Polymer compound (B) *solid fraction amount | | Binder resin 1 (styrene/acrylic water-soluble resin) | 5.0% | 5.0% | 5.0% | 5.0% | 5.0% | 5.0% | 5.0% |
| | | Joncryl 586 (acrylic water-soluble resin) acid value: 108 mgKOH/g | | | | | | | |
| | | VINYBLAN 701 (vinyl chloride emulsion) acid value: 46 mgKOH/g | | | | | 17.5% | 1.9% | 7.5% |
| Water-soluble organic solvent (C) | Specified diol (c1) | 1,3-PD (surface tension: 47.1, boiling point: 214) | 7.5% | 7.5% | 7.5% | 7.5% | 7.5% | 7.5% | 7.5% |
| | | EG (surface tension: 48.4, boiling point: 197) | | | | | | | |
| | Low-surface tension solvent (c2) | 1,2-HexD (surface tension: 25.9, boiling point: 223) | 22.5% | 17.5% | | | | | |
| | | 1,2-BD (surface tension: 31.6, boiling point: 194) | | 5.0% | 22.5% | 17.5% | 22.5% | 5.6% | 35.0% |
| | | PGM (surface tension: 23.5, boiling point: 121) | | | | 15.0% | | | |
| | Other solvents | NMP (surface tension: 40.3, boiling point: 202) | | | | | | | |
| | | *2-pyrroIidone (surface tension: 45, boiling point: 245) | | | | | | | |
| | | *glycerol (surface tension: 62, boiling point: 290) | | | | | | 7.5% | |
| Surfactant (D) | | TEGO Wet 280 | 2.0% | 2.0% | 2.0% | 2.0% | 2.0% | 2.0% | 2.0% |
| Weight average boiling point at 1 atmosphere for water-soluble organic solvent (C) (°C) | | | 221 | 216 | 144 | 170 | 203 | 198 | 198 |
| Formula values | | (1) WA | | | | | 4.0 | 4.0 | 4.0 |
| | | (2) WA + WB | | | | | 9.0 | 9.0 | 9.0 |
| | | (3) WC1 + WC2 | | | | | 40.0 | 7.5 | 42.5 |
| | | (4) WC1/(WA + WB) | | | | | 1.94 | 0.21 | 0.83 |
| | | (5) WC2/WC1 | | | | | 1.29 | 2.95 | 4.67 |
| Evaluation results | | Evaluation 1: Ink stability | | | | | AA | AA | AA |
| | | Evaluation 2: Color development | | | | | AA | AA | AA |
| | | Evaluation 3: Solid portion voids | | | | | C | B | AA |
| | | Evaluation 4: Color boundary bleeding | | | | | A | C | AA |
| | | Evaluation 5: Aggregation irregularities | | | | | C | A | A |
| | | Evaluation 6: Drying properties | | | | | B | B | C |
| | | Evaluation 7: Rub fastness | | | | | AA | C | AA |
| | | Evaluation 8A: Intermittent dischargeability using printer — Head A | | | | | AA | AA | AA |
| | | Evaluation 8A — Head B | | | | | AA | AA | AA |
| | | Evaluation 8B: Intermittent dischargeability using discharge evaluator — Nozzle diameter: 40 μm | | | | | AA | AA | AA |
| | | Evaluation 8B — Nozzle diameter: 25 μm | | | | | AA | B | AA |
| | | Evaluation 8B — Nozzle diameter: 15 μm | | | | | A | B | A |
| | | Evaluation 9: Nozzle blockages upon long standby — Head A | | | | | A | B | A |
| | | Evaluation 9 — Head B | | | | | A | C | A |

TABLE 4-continued

| | | | | | | | | | Comparative Example 18 81 | Comparative Example 19 82 |
|---|---|---|---|---|---|---|---|---|---|---|
| Formula values | (1) WA | | | 4.0 | 4.0 | 4.0 | 4.0 | 4.0 | 4.0 | 4.0 |
| | (2) WA + WB | | | 9.0 | 9.0 | 9.0 | 9.0 | 9.0 | 9.0 | 9.0 |
| | (3) WC1 + WC2 | | | 30.0 | 30.0 | 40.0 | 7.5 | 25.0 | 25.0 | 25.0 |
| | (4) WC1/(WA + WB) | | | 0.83 | 0.83 | 0.83 | 0.83 | 0.83 | 0.83 | 0.83 |
| | (5) WC2/WC1 | | | 3.00 | 3.00 | 4.33 | 0.00 | 2.33 | 2.33 | 2.33 |
| Evaluation results | Evaluation 1: Ink stability | | | A | B | B | A | AA | AA | AA |
| | Evaluation 2: Color development | | | AA | AA | AA | AA | AA | AA | AA |
| | Evaluation 3: Solid portion voids | | | AA | AA | AA | C | B | B | A |
| | Evaluation 4: Color boundary bleeding | | | AA | A | A | B | AA | AA | AA |
| | Evaluation 5: Aggregation irregularities | | | AA | AA | AA | C | AA | AA | AA |
| | Evaluation 6: Drying properties | | | C | C | C | B | C | C | B |
| | Evaluation 7: Rub fastness | | | AA | AA | AA | B | AA | C | C |
| | Evaluation 8A: Intermittent dischargeability using printer | Head A | | B | C | AA | AA | AA | AA | AA |
| | | Head B | | B | C | AA | AA | AA | AA | A |
| | Evaluation 8B: Intermittent dischargeability using discharge evaluator | Nozzle diameter: 40 μm | | A | C | A | AA | AA | AA | B |
| | | Nozzle diameter: 25 μm | | B | C | B | AA | AA | A | A |
| | | Nozzle diameter: 15 μm | | C | C | C | A | A | A | B |
| | Evaluation 9: Nozzle blockages upon long standby | Head A | | A | B | B | A | A | A | B |
| | | Head B | | A | C | C | A | A | A | B |

Ink
- Pigment (A): Pigment dispersion (pigment concentration: 20%)
- Polymer compound (B): Binder resin 1 (styrene/acrylic water-soluble resin) acid value: 65 mgKOH/g
  - *solid fraction amount
  - Joncryl 586 (acrylic water-soluble resin) acid value: 108 mgKOH/g
  - VINYBLAN 701 (vinyl chloride emulsion) acid value: 46 mgKOH/g
- Water-soluble organic solvent (C):
  - Specified diol (c1): 1,3-PD (surface tension: 47.1, boiling point: 214)
    - EG (surface tension: 48.4, boiling point: 197)
  - Low-surface tension solvent (c2): 1,2-HexD (surface tension: 25.9, boiling point: 223)
    - 1,2-BD (surface tension: 31.6, boiling point: 194)
    - PGM (surface tension: 23.5, boiling point: 121)
  - Other solvents: NMP (surface tension: 40.3, boiling point: 202)
    - *2-pyrrolidone (surface tension: 45, boiling point: 245)
    - *glycerol (surface tension: 62, boiling point: 290)
- Surfactant (D): TEGO Wet 280
- Weight average boiling point at 1 atmosphere for water-soluble organic solvent (C) (°C.)

Comparative Example 18 (column values for ink composition):
- Pigment (A): 20.0%
- Polymer compound (B): 5.0%
- 1,3-PD: 7.5%
- 1,2-HexD: 7.5%
- PGM: 10.0%
- 2-pyrrolidone: 7.5%
- TEGO Wet 280: 2.0%
- Weight average boiling point: 198

Comparative Example 19:
- Pigment (A): 20.0%
- Polymer compound (B): 5.0%
- 1,3-PD: 7.5%
- 1,2-HexD: 22.5%
- Weight average boiling point: 199

TABLE 4-continued

| | | | |
|---|---|---|---|
| Evaluation 8A: Intermittent dischargeability using printer | Head A | B | AA |
| | Head B | C | AA |
| Evaluation 8B: Intermittent dischargeability using discharge evaluator | Nozzle diameter: 40 μm | A | AA |
| | Nozzle diameter: 25 μm | B | AA |
| | Nozzle diameter: 15 μm | C | A |
| Evaluation 9: Nozzle blockages upon long standby | Head A | B | A |
| | Head B | B | A |

* Water-soluble organic solvents marked with this symbol correspond with water-soluble organic solvents having a boiling point of 240° C. or higher In Tables 1 to 4, the blend amounts for the polymer compounds (B) represent solid fraction equivalent values.

Examples 1 to 63, Comparative Examples 1 to 19

Using the prepared inks 1 to 82, each of the evaluations described below was performed. The evaluation results were as shown in Tables 1 to 4.

Evaluation 1: Evaluation of Ink Storage Stability

For each color of the inks 1 to 82, the ink viscosity was measured using an E-type viscometer (TVE-20L, manufactured by Toki Sangyo Co., Ltd.), under conditions including a temperature of 25° C. and a rotational rate of 50 rpm. The ink was then placed in a sealed container and stored in a thermostatic chamber at 70° C., and after causing an accelerated change in viscosity over time, the same apparatus was used to remeasure the viscosity, and the storage stability of the ink was evaluated by calculating the change in the ink viscosity over the storage period. The evaluation criteria were as follows, with evaluations of AA, A and B representing practically usable levels. The results shown in Tables 1 to 4 indicate only the result for the color that exhibited the worst result among the 4 colors that were evaluated.

AA: the change in viscosity after storage for 4 weeks was less than ±5%

A: the change in viscosity after storage for 2 weeks was less than ±5%, but the change in viscosity after storage for 4 weeks was at least ±5%

B: the change in viscosity after storage for 1 week was less than ±5%, but the change in viscosity after storage for 2 weeks was at least ±5%

C: the change in viscosity after storage for 1 week was at least ±5%

Evaluation 2: Evaluation of Color Development (Image Density)

An inkjet discharge apparatus was fitted with four heads manufactured by Kyocera Corporation (model: KJ4B-1200, design resolution: 1200 dpi, nozzle diameter: 20 μm) arranged along the transport direction of the printing substrate, and the heads were filled with black, cyan, magenta and yellow inks in that order from the upstream side. Further, Finesse Gloss paper (a coated paper, weight: 80 g/m$^2$) manufactured by UPM Corporation, and NPI-70 paper (a plain paper) manufactured by Nippon Paper Industries Co., Ltd. were prepared as printing substrates.

Each of the above printing substrates was transported at a fixed speed and passed beneath the heads described above. During that time, ink was discharged from each of the heads under conditions including a frequency of 20 kHz, 1200× 1200 dpi, and a drop volume of 2.5 pL, and an image was printed so that 5 cm×5 cm solid patches of each color, each having a coverage rate of 100%, were arranged adjacent to one another. After printing, the printed item was immediately placed in a 70° C. air oven and dried for 2 minutes, thus obtaining a solid patch printed item. The density (OD value) of the solid portions printed on each substrate was measured using a colorimeter (eye-one pro, manufactured by X-Rite, Inc., observation light source: D50, observation field of view: 2°, density: ANSI T, white standard: Abs, measurement mode: reflectance), and the color development (image density) was evaluated. The evaluation criteria were as follows, with evaluations of AA, A and B representing practically usable levels. The results shown in Tables 1 to 4 indicate only the result for the color that exhibited the worst result among the 4 colors that were evaluated.

AA: difference in density (OD) values between the two substrates of ±0.3 or less A: difference in density (OD) values between the two substrates of more than ±0.3 but not more than ±0.5

B: difference in density (OD) values between the two substrates of more than ±0.5 but not more than ±1.0

C: difference in density (OD) values between the two substrates of more than ±1.0

Evaluation 3: Evaluation of Solid Portion Voids

Using the solid patch printed item on Finesse Gloss paper produced in the evaluation 2, a void evaluation was performed by inspecting the level of voids in the printed item under a magnifying glass and with the naked eye. The evaluation criteria were as follows, with evaluations of AA, A and B representing practically usable levels. The results shown in Tables 1 to 4 indicate only the result for the color that exhibited the worst result among the 4 colors that were evaluated.

AA: no voids were visible under the magnifying glass or with the naked eye

A: slight voids were visible under the magnifying glass, but no voids were visible with the naked eye B: slight voids were visible with the naked eye C: voids were clearly visible with the naked eye Evaluation 4: Evaluation of Boundary Bleeding Between Colors Using the solid patch printed item on Finesse Gloss paper produced in the evaluation 2, an evaluation of boundary bleeding was performed by inspecting the boundary bleeding between colors in the printed item under a magnifying glass and with the naked eye. The evaluation criteria were as follows, with evaluations of AA, A and B representing practically usable levels.

AA: no boundary bleeding between colors was visible under the magnifying glass or with the naked eye A: slight boundary bleeding between colors was visible under the magnifying glass, but no boundary bleeding was visible with the naked eye B: slight boundary bleeding between colors was visible with the naked eye C: boundary bleeding between colors was clearly visible with the naked eye Evaluation 5: Evaluation of Aggregation Irregularities Using the same printing conditions as the evaluation 2 and using Finesse Gloss paper manufactured by UPM Corporation as the printing substrate, each of the colors, namely cyan, magenta, yellow and black, was used to print a gradation pattern in which the coverage rate varied from 10% to 100% in 10% steps. Following printing, the printed item was immediately placed in a 70° C. air oven and dried for 2 minutes, thus obtaining a gradation printed item. An evaluation of the aggregation irregularities was performed by inspecting the level of aggregation irregularities in the printed portions having coverage rates of 20%, 50% and 80% under a magnifying glass and with the naked eye. The evaluation criteria were as follows, with evaluations of AA, A and B representing practically usable levels. The results shown in Tables 1 to 4 indicate only the result for the color that exhibited the worst result among the 4 colors that were evaluated.

AA: no aggregation irregularities were visible under a magnifying glass or with the naked eye in any of the locations at coverage rates of 20%, 50% and 80%

A: aggregation irregularities were visible under a magnifying glass in one or more of the locations at coverage rates of 20%, 50% and 80%, but no aggregation irregularities were visible with the naked eye B: slight aggregation irregularities were visible with the naked eye in one or more of the locations at coverage rates of 20%, 50% and 80%

C: aggregation irregularities were clearly visible with the naked eye in one or more of the locations at coverage rates of 20%, 50% and 80%

Evaluation 6: Evaluation of Drying Properties

Using the same printing conditions as the evaluation 2 and using Finesse Gloss paper manufactured by UPM Corporation as the printing substrate, a solid image was printed at a coverage rate of 300% by overlaying solid printed portions of each of cyan, magenta and yellow each having a coverage rate of 100%. After printing, the printed item was immediately placed in a 70° C. air oven and heated for a prescribed time, and the drying properties of the printed item were evaluated by touching the printed item with a finger. The evaluation criteria were as follows, with evaluations of AA, A and B representing practically usable levels.

AA: even when the printed item was touched with a finger after 30 seconds in the oven, no ink adhered to the finger A: ink adhered to the finger after 30 seconds in the oven, but no ink adhered after 60 seconds in the oven B: ink adhered to the finger after 60 seconds in the oven, but no ink adhered after 90 seconds in the oven C: ink adhered to the finger even after 90 seconds in the oven Evaluation 7: Evaluation of Rub Fastness Using the same printing conditions as the evaluation 2 and using Finesse Gloss paper manufactured by UPM Corporation as the printing substrate, a 100% solid image of 15 cm×12 cm was printed using each of the colors. Following printing, the printed item was immediately placed in a 70° C. air oven and dried for 3 minutes, thus obtaining a solid printed item.

This solid printed item was installed in a Sutherland Rub Tester (manufactured by Toyo Seiki Seisaku-sho, Ltd.) fitted with a rubbing target paper (NPI-70, manufactured by Nippon Paper Industries Co., Ltd.), and following a prescribed number of back and forth nabbing repetitions under a load of 4 pounds, the rub fastness was evaluated by inspecting the printed item visually to ascertain whether the ink had been rubbed off to expose the substrate. The evaluation criteria were as follows, with evaluations of AA, A and B representing practically usable levels. The results shown in Tables 1 to 4 indicate only the result for the color that exhibited the worst result among the 4 colors that were evaluated.

AA: even after 20 back and forth rubbing repetitions, the ink remained and the substrate was not visible A: after 20 back and forth rubbing repetitions, the ink had rubbed off and the substrate was visible, but after 15 back and forth repetitions, the substrate was not visible B: after 15 back and forth rubbing repetitions, the ink had rubbed off and the substrate was visible, but after 10 back and forth repetitions, the substrate was not visible C: the ink had rubbed off and the substrate was visible even after 10 back and forth rubbing repetitions Evaluation 8A: Evaluation of Intermittent Dischargeability Using Printer Four inkjet heads of the two head types described below were respectively installed in the same printing apparatus as the evaluation 2. The heads were then filled with black, cyan, magenta and yellow inks in that order from the upstream side. Following filling, a nozzle check pattern was printed (drop volume: head A: 5 pL, head B: 2.5 pL), and following confirmation that ink discharge had occurred normally from all of the nozzles, the printing apparatus was placed in standby in an environment of 25° C. with no discharge occurring for a prescribed period of time, and a second nozzle check pattern was then printed. The intermittent dischargeability was evaluated by visually checking whether any nozzle misfires (a phenomenon where no ink is discharged from the nozzle) had occurred following the standby period. The evaluation criteria were as follows, with evaluations of AA, A and B representing practically usable levels. The results shown in Tables 1 to 4 indicate only the result for the color that exhibited the worst result among the 4 colors that were evaluated.

AA: even when printing was performed after standby of 3 hours, absolutely no nozzle misfires occurred A: when printing was performed after standby of 2 hours, absolutely no nozzle misfires occurred, but when printing was performed after standby of 3 hours, some misfires occurred B: when printing was performed after standby of 1 hour, absolutely no nozzle misfires occurred, but when printing was performed after standby of 2 hours, some misfires occurred C: even when printing was performed after standby of 1 hour, 1 to 9 nozzle misfires occurred The inkjet heads used in the evaluation 8A and the evaluation 9 described below were as follows.

Head A: a head manufactured by Kyocera Corporation (model: KJ4B-QA, design resolution: 600 dpi, nozzle diameter: 25 μm)

Head B: a head manufactured by Kyocera Corporation (model: KJ4B-1200, design resolution: 1200 dpi, nozzle diameter: 20 μm)

Evaluation 8B: Evaluation of Intermittent Dischargeability Using Discharge Evaluator Each of the magenta inks (1M to 82M) was loaded into a pulse injector manufactured by Cluster Technology Co., Ltd. fitted with an evaluation head having a nozzle with a nozzle diameter of 15 μm. Following confirmation of normal ink discharge, the pulse injector was placed in standby in an environment of 25° C. for a prescribed period of time. Subsequently, a drive waveform signal for performing a single drop discharge was transmitted 4 times, a sheet of NPI-70 paper manufactured by Nippon Paper Industries Co., Ltd. was then placed beneath the nozzle, and one drive waveform signal for performing a single drop discharge was again transmitted. The intermittent dischargeability was evaluated by ascertaining whether the ink droplet had been discharged normally onto the NPI-70 paper. The evaluation criteria were as follows, with evaluations of AA, A and B representing practically usable levels. The same test was also performed using evaluation heads having a nozzle diameter of 25 μm and a nozzle diameter of 40 μm respectively.

AA: even after 3 hours of standby, the ink was discharged onto the NPI-70

A: the ink was discharged onto the NPI-70 after 2 hours of standby, but was not discharged after 3 hours of standby B: the ink was discharged onto the NPI-70 after 1 hour of standby, but was not discharged after 2 hours of standby C: even after 1 hour of standby, the ink was not discharged onto the NPI-70

Evaluation 9: Evaluation of Nozzle Blockages Upon Long Standby

Each of the inkjet heads A and B described above was mounted in the same printing apparatus as that used in the evaluation 8A, and the head was filled with one of the magenta inks (1M to 82M). Following filling, a nozzle check pattern was printed (drop volume: head A: 5 pL, head B: 2.5 pL), and following confirmation that ink discharge had occurred normally from all of the nozzles, the printing apparatus was placed in standby with no head cap for one week in an environment at 25° C. After one week, a typical maintenance operation was executed once, in which about 10 mL of the same ink was purged, and ink adhered to the nozzle surface (the surface in the inkjet head on which the nozzle discharge ports are provided) was wiped off. Subsequently, a second nozzle check pattern was printed and checked for nozzle misfires (nozzle check 1).

When a nozzle misfire was confirmed in the nozzle check 1, a powerful maintenance operation was executed once, in which all of the ink inside the inkjet head was extracted, purging was performed with 200 mL of a cleaning liquid, and cleaning liquid adhered to the nozzle surface was then wiped off. Subsequently, the same ink was used to refill the inkjet head, and another nozzle check pattern was printed and checked for nozzle misfires (nozzle check 2). For the cleaning liquid, a liquid was used that had been prepared in a similar manner to each ink, but in which all of the components except for the water-soluble organic solvent (C) having the largest blend volume had been replaced with water. To give one specific example, the cleaning liquid for the ink 1M was a mixed solution of 22.5% by weight of 1,2-butanediol and 77.5% by weight of water.

An evaluation of nozzle blockages upon long standby was performed by checking the patterns in the nozzle check 1 and the nozzle check 2 for nozzle misfires. The evaluation criteria were as follows, with evaluations of A and B representing practically usable levels.

A: absolutely no nozzle misfires occurred in nozzle check 1

B: nozzle misfires occurred in nozzle check 1, but absolutely no nozzle misfires occurred in nozzle check 2

C: nozzle misfires occurred in nozzle check 2

Evaluation Results for Examples and Comparative Examples

Comparative Example 1 was a system in which the amount WA of the pigment (A) relative to the total weight of the ink was less than 3% by weight, and the color development exhibited a poor result. On the other hand, Comparative Example 2 was a system in which WA exceeded 7% by weight, and the storage stability and the intermittent dischargeability when the head having a very fine nozzle diameter was used were poor, and nozzle blockages were also observed. Similarly, in Comparative Example 4 in which the acid value of the polymer compound was outside the preferred range, the intermittent dischargeability when the head having a very fine nozzle diameter was used was poor, and nozzle blockages were also observed.

In Comparative Examples 3 and 5, the value of WA+WB was outside the preferred range, and a deterioration in the rub fastness, a deterioration in the intermittent dischargeability and nozzle blockages were all observed. Further, Comparative Example 19 was a system in which, although the amounts and ratios of the pigment (A), the polymer compound (B) and the water-soluble organic solvent (C) in the aqueous ink were all favorable, no surfactant (D) was included, and voids in the solid printed portions, color boundary bleeding and aggregation irregularities were all observed, it is thought due to poor wet spreadability of the aqueous ink on the printing substrate.

Comparative Examples 6 to 18 were systems in which the water-soluble organic solvent (C) was not used in a favorable manner, and the results for the quality of the printed items, the drying properties of the aqueous ink, the intermittent dischargeability, and the discharge properties after a long standby period were all unsatisfactory.

In contrast, Examples 1 to 63 were systems in which the pigment (A), the polymer compound (B), the water-soluble organic solvent (C) and the surfactant (D) were all used in amounts that satisfied the respective preferred ranges, and the stability, drying properties and intermittent dischargeability of the ink, the level of nozzle blockages after a long standby period, and the color development, voids within solid printed portions, color boundary bleeding, aggregation irregularities and rub fastness of the printed items were all within practically usable ranges. Among the examples, Example 63 was a system in which ethylene glycol was used as the specified diol (c1), a combination of 1,2-butanediol and 1,2-hexanediol was used as the low-surface tension solvent (c2) having a static surface tension at 25° C. of 20 to 37 mN/m, with the amounts of the two solvents adjusted so that the weight average boiling point at 1 atmosphere of the water-soluble organic solvent (C) was from 180 to 210° C., and a siloxane-based surfactant was used as the surfactant, and extremely superior evaluation results were observed for all of the evaluation items.

INDUSTRIAL APPLICABILITY

The aqueous inkjet ink that represents an embodiment of the present invention is capable of producing images of excellent image quality, even when high-speed printing is performed to a low-absorption substrate using an inkjet head having a very fine nozzle diameter of 15 to 25 μm. Further, by using a method for producing a printed item according to an embodiment of the present invention that uses this aqueous inkjet ink, printed items that also have excellent fine detail can be obtained. Accordingly, the aqueous inkjet ink according to an embodiment of the present invention can be used favorably for performing inkjet printing using low-absorption substrates at the types of high speeds and high recording resolutions ideal for commercial printing.

The invention claimed is:

1. An aqueous inkjet ink comprising a pigment (A), a polymer compound (B), a water-soluble organic solvent (C) and a surfactant (D), wherein an acid value of the polymer compound (B) is from 10 to 100 mgKOH/g, the water-soluble organic solvent (C) comprises ethylene glycol and/or 1,3-propanediol (c1), and a water-soluble organic solvent (c2) having a static surface tension at 25° C. of 20 to 37 mN/m, and an amount of water-soluble organic solvent having a boiling point at 1 atmosphere of 240° C. or higher is not more than 5% by weight relative to a total weight of the aqueous inkjet ink, a weight average boiling point at 1 atmosphere for the water-soluble organic solvent (C) is from 180 to 210° C., and relative to a total weight of the aqueous inkjet ink, if an amount of the pigment (A) is termed WA (% by weight), an amount of the polymer compound (B) is termed WB (% by weight), an amount of the ethylene glycol and/or 1,3-propanediol (c1) is termed WC1 (% by weight), and an amount of the water-soluble organic solvent (c2) having a static surface tension at 25° C. of 20 to 37 mN/m is termed WC2 (% by weight), then WA, WB, WC1 and WC2 satisfy all of formulas (1) to (5) shown below:

$$3 \leq WA \leq 7 \tag{1}$$

$$6 \leq WA+WB \leq 20 \tag{2}$$

$$10 \leq WC1+WC2 \leq 40 \tag{3}$$

$$0.25 \leq WC1/(WA+WB) \leq 1.75 \tag{4}$$

$$1.5 \leq WC2/WC1 \leq 5 \tag{5}$$

2. The aqueous inkjet ink according to claim 1, wherein the water-soluble organic solvent (c2) having a static surface tension at 25° C. of 20 to 37 mN/m comprises a 1,2-alkanediol of 3 to 6 carbon atoms.

3. The aqueous inkjet ink according to claim 1, wherein the ethylene glycol and/or 1,3-propanediol (c1) comprises ethylene glycol.

4. The aqueous inkjet ink according to claim 1, wherein an amount of the surfactant (D) is from 1 to 5% by weight of a total weight of the aqueous inkjet ink.

5. The aqueous inkjet ink according to claim 1, wherein the surfactant (D) comprises a siloxane-based surfactant.

6. A method for producing an aqueous inkjet ink printed item, the method having a step of discharging the aqueous inkjet ink according to claim 1 from an inkjet head and adhering the aqueous inkjet ink to a printing substrate, and a step of drying the printing substrate with the adhered aqueous inkjet ink, wherein a nozzle diameter of the inkjet head is from 15 to 25 μm, and a design resolution of the inkjet head is 600 dpi or higher.

7. The aqueous inkjet ink according to claim 2, wherein the ethylene glycol and/or 1,3-propanediol (c1) comprises ethylene glycol.

8. The aqueous inkjet ink according to claim 2, wherein an amount of the surfactant (D) is from 1 to 5% by weight of a total weight of the aqueous inkjet ink.

9. The aqueous inkjet ink according to claim 2, wherein the surfactant (D) comprises a siloxane-based surfactant.

10. A method for producing an aqueous inkjet ink printed item, the method having a step of discharging the aqueous inkjet ink according to claim 2 from an inkjet head and adhering the aqueous inkjet ink to a printing substrate, and a step of drying the printing substrate with the adhered aqueous inkjet ink, wherein a nozzle diameter of the inkjet head is from 15 to 25 μm, and a design resolution of the inkjet head is 600 dpi or higher.

* * * * *